United States Patent
Derkacz et al.

(10) Patent No.: US 11,215,014 B2
(45) Date of Patent: Jan. 4, 2022

(54) PRELOADABLE CONNECTORS FOR TUBING

(71) Applicant: Evolution Engineering Inc., Calgary (CA)

(72) Inventors: Patrick Robert Derkacz, Calgary (CA); Justin Christopher Logan, Calgary (CA); Luke Anthony Stack, Calgary (CA); Gavin Gaw-Wae Lee, Calgary (CA); Aaron William Logan, Calgary (CA)

(73) Assignee: EVOLUTION ENGINEERING INC., Calgary (CA)

(*) Notice: Subject to any disclaimer, the term of this patent is extended or adjusted under 35 U.S.C. 154(b) by 518 days.

(21) Appl. No.: 15/962,456

(22) Filed: Apr. 25, 2018

(65) Prior Publication Data

US 2018/0305986 A1 Oct. 25, 2018

Related U.S. Application Data

(60) Provisional application No. 62/489,579, filed on Apr. 25, 2017.

(51) Int. Cl.
*E21B 17/046* (2006.01)
*E21B 17/04* (2006.01)
(Continued)

(52) U.S. Cl.
CPC ............ *E21B 17/046* (2013.01); *E21B 17/04* (2013.01); *F16L 21/08* (2013.01); *H02G 3/06* (2013.01)

(58) Field of Classification Search
CPC ........ E21B 17/046; E21B 17/04; F16L 21/08; F16L 37/252; H02G 3/06
(Continued)

(56) References Cited

U.S. PATENT DOCUMENTS

| | | | | |
|---|---|---|---|---|
| 1,818,261 A | * | 8/1931 | Koch | F16B 7/0406 |
| | | | | 403/341 |
| 4,185,856 A | * | 1/1980 | McCaskill | E21B 17/085 |
| | | | | 166/340 |

(Continued)

FOREIGN PATENT DOCUMENTS

| | | | | |
|---|---|---|---|---|
| CA | 2460245 A1 | * | 9/2004 | F16L 25/065 |
| DE | 9208672 U1 | * | 9/1992 | E21B 17/04 |

(Continued)

*Primary Examiner* — Matthew Troutman
*Assistant Examiner* — Fannie C Kee
(74) *Attorney, Agent, or Firm* — NK Patent Law

(57) ABSTRACT

Connectors and connection systems for connecting two tubing sections together are provided. The connectors can include: a first end having an outer surface and adapted for insertion into an end of the tubing section and a second end adapted for connection to a second connector. The connector can have an attachment block in one aspect with a first threaded aperture and a second threaded aperture passing through it so that axial screws and radial screws can secure the connector to the end of a tubing section before it is connected to another connector. In another aspect, the connector can have an attachment slot provided in an outer surface of the first end of the connector sized to fit a retaining clips so that axial screws can secure the connector to an end of a tubing section before the connector is connected to another connector.

20 Claims, 18 Drawing Sheets

(51) Int. Cl.
*F16L 21/08* (2006.01)
*H02G 3/06* (2006.01)

(58) Field of Classification Search
USPC .................................. 285/24, 400, 403–404
See application file for complete search history.

(56) References Cited

U.S. PATENT DOCUMENTS

| | | | | |
|---|---|---|---|---|
| 4,206,821 A | * | 6/1980 | Emmerich | E21B 17/03 |
| | | | | 175/315 |
| 4,986,690 A | * | 1/1991 | Cooksey | E21B 17/02 |
| | | | | 403/27 |
| 9,366,093 B2 | * | 6/2016 | McMiles | E21B 17/046 |

FOREIGN PATENT DOCUMENTS

| | | | | | |
|---|---|---|---|---|---|
| FR | | 742244 A | * | 3/1933 | ........... E21B 17/046 |
| FR | | 2860829 A1 | * | 4/2005 | ........... E21B 17/046 |

* cited by examiner

PRELOADABLE CONNECTORS FOR TUBING

CROSS-REFERENCE TO RELATED APPLICATIONS

This application claims priority to U.S. Provisional Patent Application No. 62/489,579 filed on Apr. 25, 2017, the entire content of which is incorporated by reference herein.

FIELD OF THE INVENTION

The present invention relates to an apparatus for connecting tubular sections.

BACKGROUND

Recovering hydrocarbons from underground formations typically requires drilling of wells in order to reach and produce the hydrocarbon. These wells are drilled using equipment located at the ground surface that is used to drive a drill string and this drill string is in turn used to control a drill located at the bottom of the drill string. The drill at the bottom of the drill string drills the well starting from the ground surface and then is lowered down on the drill string as the length of the well is extended by drilling until it reaches the desired depth or length. The depth (or length) of the well can extend thousands of meters underground so the drill string will be just as deep or long as the well because the drill string must reach the entire depth or length of the well.

The equipment at the bottom of the drill string that drills the well bore is commonly referred to as the bottom hole assembly or BHA and part of this equipment includes the drill bit used to drill the well bore. This drill bit can be driven by drilling mud that is pumped down the well bore of the already drilled portion of the well around the drill string in the well. When this mud reaches the bottom of the drill string it can be directed through a mud motor which in turn drives the drill bit and drills the well. This drilling mud also cools and lubricates the drill bit as well as carrying cuttings removed from the well bore back up to the surface.

In addition to the drill bit, the BHA includes other components for drilling the well bore. For example, in BHA's capable of directional drilling, equipment for altering the direction of the drill bit (steering) are included. The BHA will also include electronics and sensors so that the BHA can perform logging while drilling (LWD) and measurements while drilling (MWD) along with other electronics to transmit data to the ground surface, etc. LWD is a technique where sensors and other electronics are used to measure conditions in and around the well bore where the BHA is positioned and store this information. This information can be used to decide how to steer the BHA in a formation and to evaluate the formation (often in real time). MWD are measurements that are taken regarding the position of the BHA and the direction of the well bore so that the direction the BHA is drilling can be altered (or "steered") as desired. These measurements typically include the inclination from vertical of the well bore and the deviation of the well bore from north which can then be converted using basic trigonometry to create a three-dimensional plot of the path of the well. Ideally, an operator can plot the direction of the well being drilled in real-time and alter the direction as desired or to correct its course.

As can be imagined, these electronics in the BHA can be quite complex and relatively sensitive and the conditions downhole where the BHA is positioned are not favorable to electronics. Typically, the electronics in the BHA are enclosed in some type of enclosure that protects them from the downhole conditions and allows them to be installed as part of the BHA.

It has been found by the Applicant that these electronics can be installed in carbon fiber tubing or some other type of composite tubing and then into a pressure housing and the pressure housing then installed in the BHA. A number of tubing sections are often used to contain the electronics and batteries requiring a number of sections of tubing to be connected together. Connecting the sections of tubing together can be quite problematic both because of how the tubing and electronics are further installed in the pressure housing and the use of the carbon fiber or other composite for the tubing. Because these sections of tubing and the connectors attaching them are typically a close fit inside the pressure housing; the outside diameter of the connector often cannot be greater than the outside diameter of the tubing sections or else the connectors and tubing cannot be installed in the pressure housing properly. Often the sections of tubing and connectors have to meet very high tolerances so that they can be securely installed in the pressure housing. The carbon fiber/composite material used for the tubing, while being light and durable, is more flexible than a lot of other materials and is prone to flaring out on the ends when a connector is attached. Additionally, to secure the electronics in place inside the sections of tubing and further protect them, potting is used. The electronics are installed inside a section of tubing then the tubing is filled with potting around the installed electronics and the sections of tubing connected together. However, as this potting heats up from high environmental temperatures or during potting curing process it can expand putting force on the connector and if the connector is forced out from its initial position this can alter the desired length of the entire length of the tubing sections and connectors and cause problems or even prevent the sections of tubing and connectors from being installed in the housing.

SUMMARY OF THE INVENTION

In a first aspect, a connector for connecting two tubing sections together is provided. The connector can include: a first end having an outer surface and adapted for insertion into an end of the tubing section, the first end having an outer diameter less than an inner diameter of the tubing section; a second end adapted for connection to a second connector; an attachment block having an inner surface, an outer surface and a top surface, a first threaded aperture passing through the outer surface and a second threaded aperture passing through the top surface; an attachment block slot provided in the outer surface of the first end and sized to fit the attachment block; and an axial screw aperture passing through the first end of the connector and into the attachment block slot. The first threaded aperture can be oriented substantially radially to a central axis of the connector when the attachment block is positioned in the attachment block slot. The second threaded aperture can be oriented substantially axially to the central axis of the connector when the attachment block is positioned in the attachment block slot.

In a second aspect, a connection system for connecting a first tubing section and a second tubing section together is provided. The connection system can include a first connector having a first end having an outer surface and adapted for insertion into an end of a first tubing section, the first end having an outer diameter less than an inner of the first tubing section; a female end; an attachment block having an inner surface, an outer surface and a top surface, a first threaded aperture passing through the outer surface and a second threaded aperture passing through the top surface; an attachment block slot provided in the outer surface of the first end and sized to fit the attachment block; and an axial screw aperture passing through the first end of the first connector and into the attachment block slot. The first threaded aperture can be oriented substantially radially to a central axis of the first connector when the attachment block is positioned in the attachment block slot. The second threaded aperture can be oriented substantially axially to the central axis of the first connector when the attachment block is positioned in the attachment block slot. The connection system can also have a second connector having: a first end having an outer surface and adapted for insertion into an end of the second tubing section, the first end having an outer diameter less than an inner of the second tubing section; a male end adapted for connection to the female end of the first connector; an attachment block having an inner surface, an outer surface and a top surface, a first threaded aperture passing through the outer surface and a second threaded aperture passing through the top surface; an attachment block slot provided in the outer surface of the first end and sized to fit the attachment block; and an axial screw aperture passing through the first end of the second connector and into the attachment block slot. The first threaded aperture can be oriented substantially radially to a central axis of the second connector when the attachment block is positioned in the attachment block slot. The second threaded aperture can be oriented substantially axially to the central axis of the second connector when the attachment block is positioned in the attachment block slot.

In a third aspect, a connector for coupling two sections of tubing together. The connector having a first end having an outer surface and adapted for insertion into an end of the tubing section, the first end having an outer diameter less than an inner of the tubing section, a second end adapted for connection to a second connector, an attachment slot provided in an outer surface of the first end and sized to at least partially fit a retaining clip, an inner shoulder provided between the first end and the second end of the connector and an axial screw aperture passing through the inner shoulder and into the attachment slot.

DESCRIPTION OF THE DRAWINGS

A preferred embodiment of the present invention is described below with reference to the accompanying drawings, in which.

DETAILED DESCRIPTION OF THE ILLUSTRATED EMBODIMENTS

Figure 1:
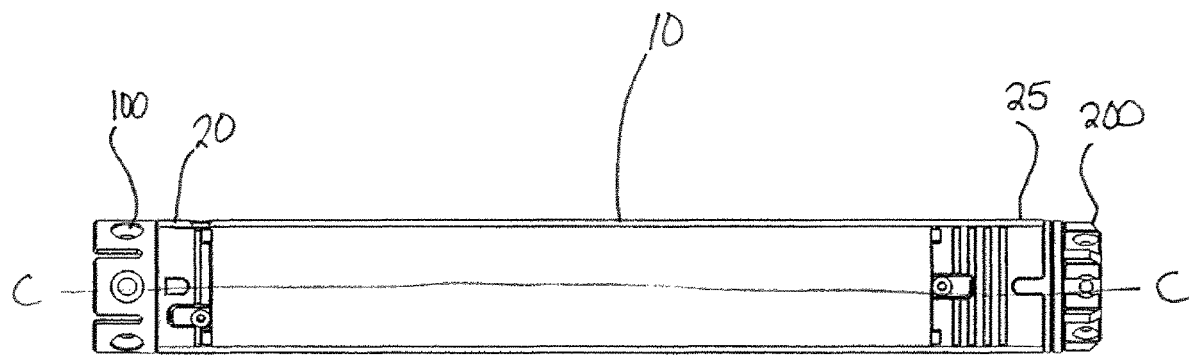
FIG. 1 is a side schematic view of a tubing section having a male connector and a female connector attached to the ends.

FIG. 1 illustrates a female connector 100 and a male connector 200 for joining a first tubing section 10 to a second tubing section (not shown). Although the female connector 100 and the male connector 200 are shown on opposite ends of the tubing section 10, they are meant to connect together to form a series of connected sections of tubing. The tubing section 10, female connector 100 and male connector 200 can define a central axis, C, that passes through the center of the female connector 100 and male connector 200 and are all connected to the tubing section 10.

In one aspect, the tubing section 10 can be made of carbon fiber or some other composite. While this can have the advantage of making the tubing section 10 easy to manufacture and relatively light, it can also cause the tubing section 10 to flex a lot more than if it was some sort of metal, ceramic, etc. However, while this flexibility can have a number of benefits it can cause the ends of the tubing section 10 to bend or distort when forces are applied to the ends. The female connector 100 and the male connector 200 are designed to apply forces in a uniform manner around an end 20 of the tubing section 10 and allow axial preloading of the female connector 100 and male connector 200 to prevent deformation of the end 20 of the tubing section 10 and movement of the female connector 100 and male connector 200 relative to the tubing section 10.

Figure 2:
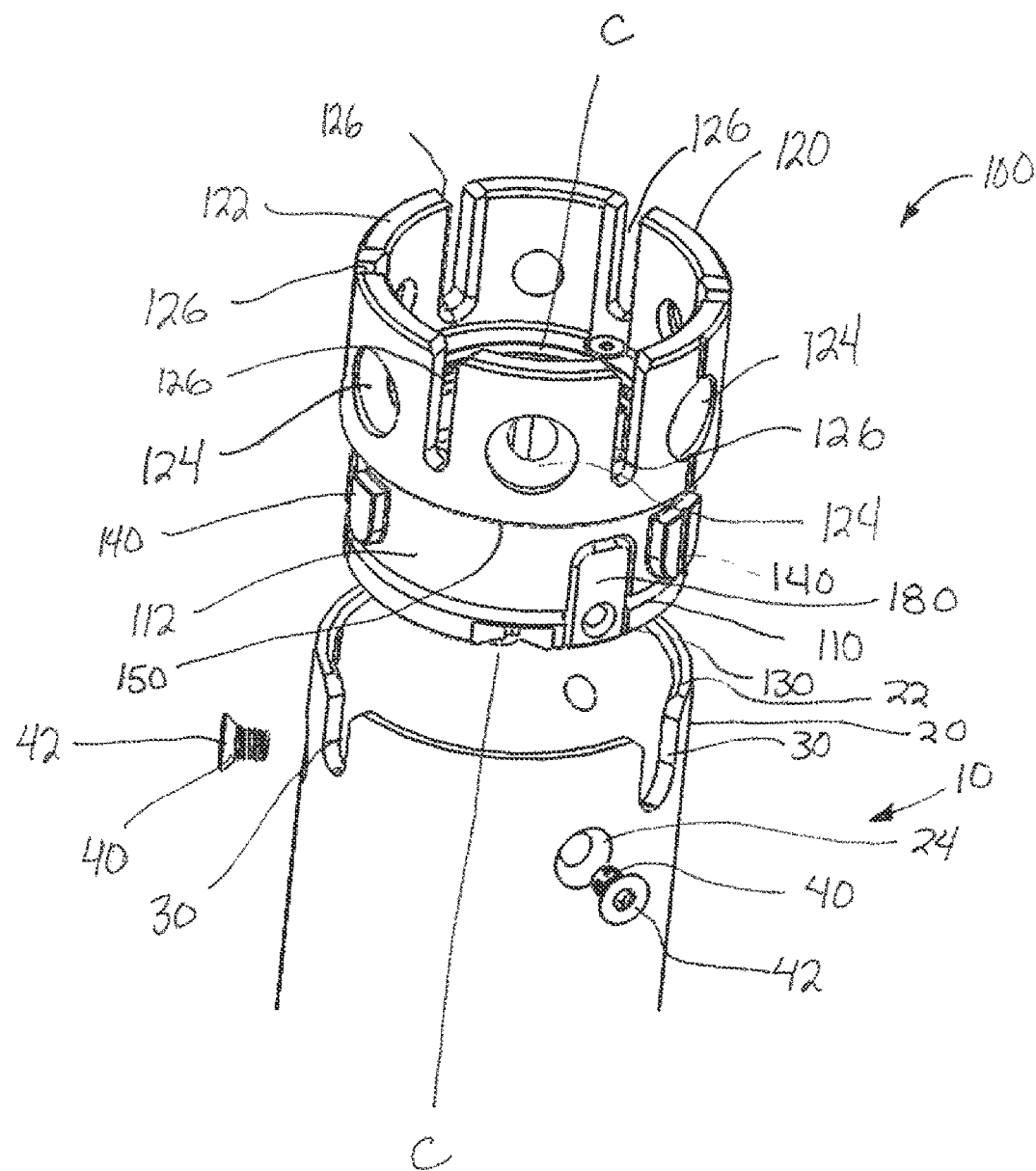
FIG. 2 is a perspective view of a female connector and an end of tubing section.
Figure 3:
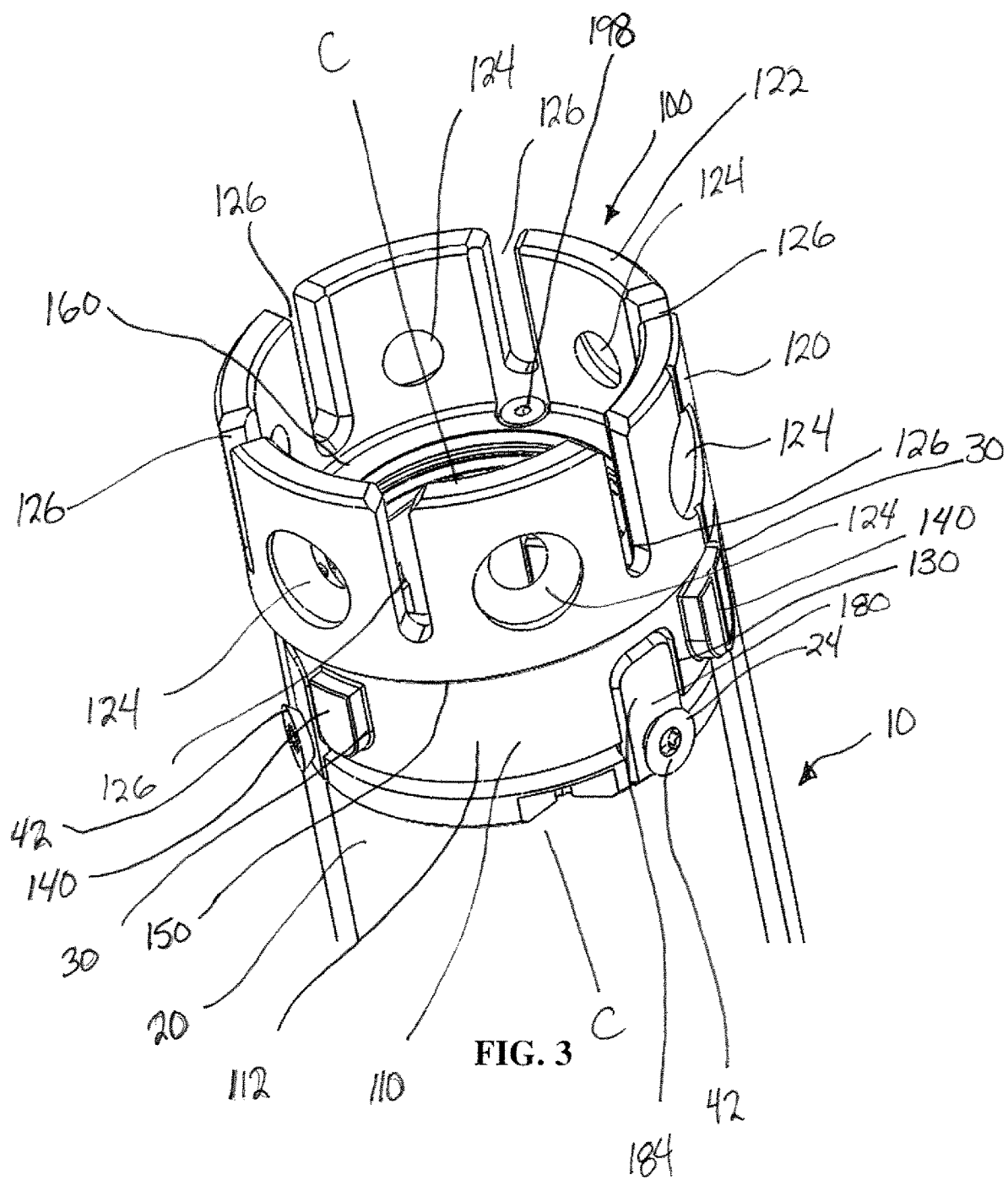
FIG. 3 is a perspective schematic view of the female connector and the end of a tubing section shown in FIG. 2.

FIGS. 2 and 3 illustrates the female connector 100 and an end 20 of the tubing section 10. The female connector 100 can have a first end 110 adapted for insertion into the end 20 of the tubing section 10 and a second end 120 adapted for connection to the male connector 200.

The first end 110 of the female connector 100 can have an outer diameter slightly less in diameter than the inner diameter of the end 20 of the tubing section 10 so that the first end 110 can be inserted into the end 20 of the tubing section 10.

Optionally, one or more alignment tabs 140 can extend outwards from an outer surface 112 of the first end 110 of the female connector 100 to be used to align the female connector 100 in the end 20 of the tubing section 10. The alignment tabs 140 can correspond to alignment slots 30 in the end 20 of the tubing section 10 to properly position the female connector 100 relative to the end 20 of the tubing section 10.

The first end 110 of the female connector 100 can have a number of attachment block slots 130 sized to fit attachment blocks 180 in these attachment block slots 130. The attachment block slots 130 are sized and positioned so that the attachment blocks 180 can be positioned inside these attachment block slots 130. The attachment block slots 130 can be sized so that the attachment blocks 180 can move axially relative to the central axis, C, of the tubing section 10 when the female connector 100 is provided in the end 20 of the tubing section 10.

There can be as few as a single attachment block slot 130 in the first end 110 of the female connector 100 and corresponding attachment block 180, but in one aspect three substantially equidistantly spaced attachment block slots 130 and corresponding attachment blocks 180 can be provided to space out the forces applied around the circumference of the end 20 of the tubing section 10.

Figure 4:
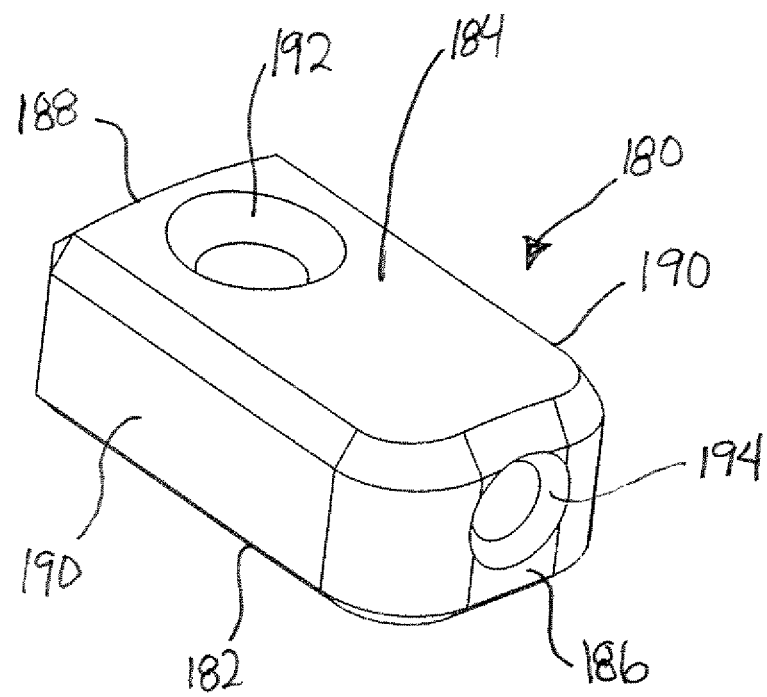
FIG. 4 is a perspective view of an attachment block.
Figure 5:
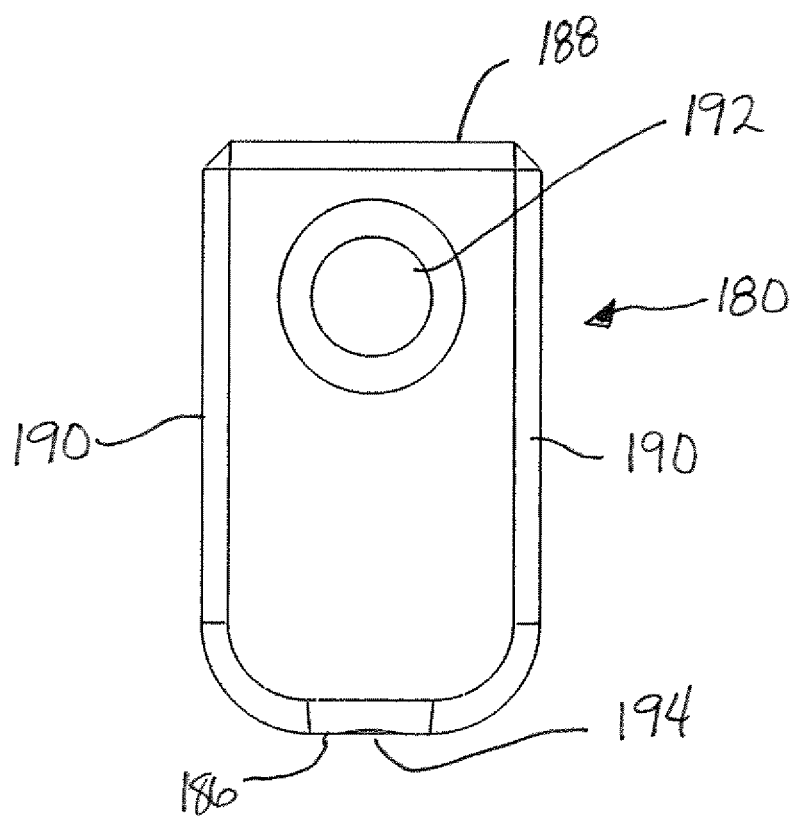
FIG. 5 is a top view of an attachment block.

FIGS. 4 and 5 illustrates an attachment block 180. Each attachment block 180 is sized to slide in the attachment block slot 130 and can have an inner surface 182, outer surface 184, top surface 186, bottom surface 188 and side surfaces 190. When the attachment block 180 is positioned in the attachment block slot 130 in the first end 110 of the female connector 100, the inner surface 182 will face inwards in the attachment block slot 130 towards the first end 110 of the female connector 100 and the outer surface 184 will face outwards from the female connector 100 and towards the inside of the end 20 of the tubing section 10 when the first end 110 of the connector 100 is slid inside the end 20 of the tubing section 10.

Figure 6:
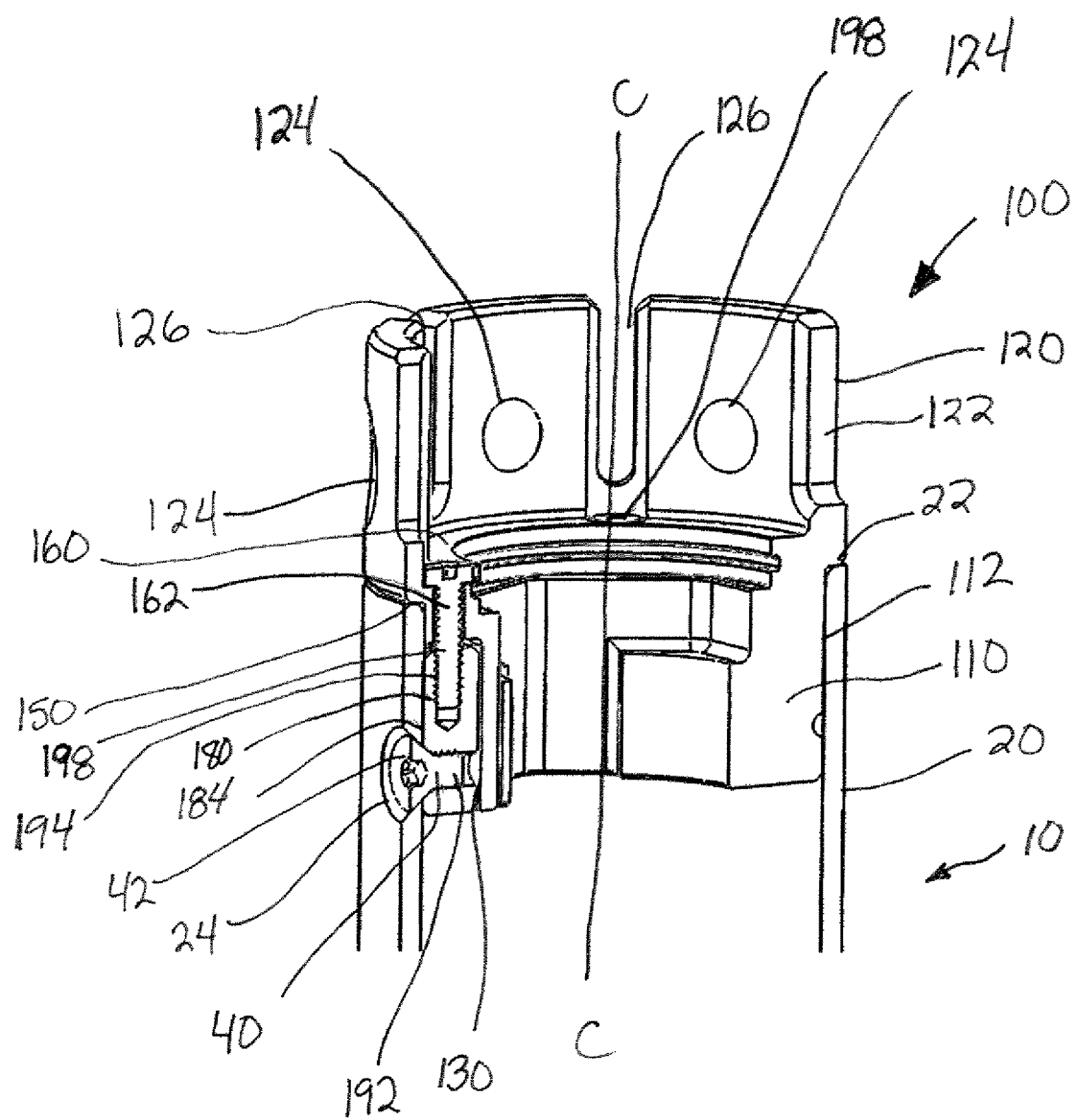
FIG. 6 is a cutaway perspective view of the female connector shown and the end of the tubing section shown in FIG. 2.

Referring to FIGS. 2, 3 and 6, the depth of the attachment block slots 130 can match the thickness of the attachment blocks 180 so that when an attachment block 180 is positioned in the attachment block slot 130, the attachment block 180 does not protrude above the outer surface 112 of the first end 110 of the female connector 100, but instead the outer surface 184 of the attachment block 180 can be substantially flush with the outer surface 112 of the first end 110 of the female connector 100. The outer surface 184 of the attachment block 180 can also have an outer radius that matches the outer radius of the outer surface 112 of the first end 110 of the female connector 100.

In other aspects, the outer surface 184 of the attachment block 180 can be raised relative to the outer surface 112 of the first end 110 of the female connector 100 or the outer surface 184 of the attachment block 180 can be recessed relative to the outer surface 112 of the first end 110 of the female connector 100. FIGS. 10-13 illustrate a connector 500 in a further aspect, having attachment block slots 530 that are deeper than the thickness of the attachment blocks 180 so that when an attachment block 180 is positioned in the attachment block slot 530, an outer surface 184 of the attachment block 180 is lower the outer surface 512 of the first end 510 of the connector 500 thereby forming a recess 540 above the outer surface 184 of the attachment block 180.

The inner surface 23 of the end 20 of the tubing section 10 that the connector 100 is connectable to can have protruding ribs 29 extending inwards from the inner surface 23 of the tubing section 10. These protruding ribs 29 can substantially correspond to the recesses 540 formed above the outer surface 184 of the attachment blocks 180 when the attachment blocks 180 are inserted in the attachment slots 530. When the first end 510 of the connector 500 is inserted in the end 20 of the tubing section 10, the protruding ribs 29 slide into the recesses 540 formed above the outer surface 184 of the attachment block 180 to engage the recesses 540 and form a better connection between the connector 500 and the end 20 of the tubing section 10. Referring again to FIGS. 2-5, each attachment block 180 can have a first threaded aperture 192 in the outer surface 184 and a second threaded aperture 194 in the top surface 186. The first threaded aperture 192 can be positioned in the outer surface 184 of the attachment block 180 so that the first threaded aperture 192 will run radially relative to the central axis, C, of the tubing section 10 when the attachment block 180 is positioned in the attachment block slot 130. The second threaded aperture 194 can be positioned in the top surface 186 so that the second threaded aperture 194 runs axial relative to the central axis, C.

The second end 120 of the female coupling 100 can be adapted to connect to the male connector 200. The outer diameter of the second end 120 can be substantially the same as the outer diameter of the end 20 of the tubing section 10 so that when the female connector 100 and male connector 200 are used to join two tubing sections 10 there is no increase in the outer diameter between a first tubing section and a second tubing section connected together using the female connector 100 and the male connector 200.

The second end 120 can have a number of connection apertures 124 passing radially through the walls 122 of the second end 120 of the female connector 200 so that screws (not shown) can be inserted into the connection apertures 124 to engage with threaded apertures 224 in the second end 220 of the male connector 200 to secure the female coupler 100 and male coupler 200 together to connect two sections of tubing 10.

A number of positioning slots 126 can pass through the wall 122 of the second end 120 of the female connector 100 to help align it with a male connector 200. These positioning slots 126 can correspond with connection ribs 226 on the male connector 200 and cause the male connector 200 to be correctly aligned with the female connector 100 so that the connection apertures 124 are aligned with the threaded apertures 224 in the second end 220 of the male connector 200.

An outer shoulder 150 can be provided in the female coupling 100 between the first end 110 and the second end 120. Not only does the outer shoulder 150 form a transition between the outer diameter of the first end 110 and the outer diameter of the second end 120 of the female connector 100, but it can be sized to sit on top of a top edge 22 of the end 20 of the tubing section 10.

FIG. 6 illustrates a cutaway view of the female connector 100 inserted in the end 20 of the tubing section 10. An inner shoulder 160 can also be provided inside the female connector 100 between the first end 110 and the second end 120 of the female connector 100. The inner shoulder 160 can extend over the smaller first end 100 of the female connector 100. A number of axial screw apertures 162 can be provided in the inner shoulder 160 above the attachment block slots 130 and passing through the inner shoulder 160 into the attachment block slot 130. The axial screw aperture 162 can be positioned so that when an attachment block 180 is positioned in the attachment block slot 130, the axial screw aperture 162 in the inner shoulder 160 and the second threaded aperture 194 in the attachment block 180 can be aligned so that an axial screw 198 can be inserted through the axial screw apertures 162 in the inner shoulder 160 and into the second threaded aperture 194 in the attachment block 180.

The end 20 of the tubing section 10 can have a number of radial apertures 24 passing therethrough. These radial apertures 24 can be positioned to align with the first threaded apertures 192 in the attachment blocks 180 when the attachment blocks 180 are positioned in the attachment block slots 130. Because the attachment blocks 180 can move axially in the attachment block slots 130 relative to the central axis C, the radial apertures 24 have to be positioned at the proper positions around the circumference of the end 20 of the tubing section 10 so that they will align with the first threaded apertures 192 in the attachment blocks 180 in the attachment block slots 130. However, the positioning of the radial apertures 24 axially relative to central axis C can vary a bit because the attachment block 180 can be moved axially in the attachment block slot 130 to accommodate some discrepancy in their axial positioning. In this manner, the distance of the radial apertures 24 from the top edge 22 of the end 20 of the tubing section 10 can vary a bit and still not create problems for attaching the female connector 100 to the end 20 of the tubing section 10.

The radial apertures 24 can be of a frusto-conical shape so that a head 42 of a radial screw 40 inserted through the radial aperture 24 can be countersunk to prevent the head 42 of the radial screw 40 extending above the outer surface of the end 20 of the tubing section 10.

Figure 7:
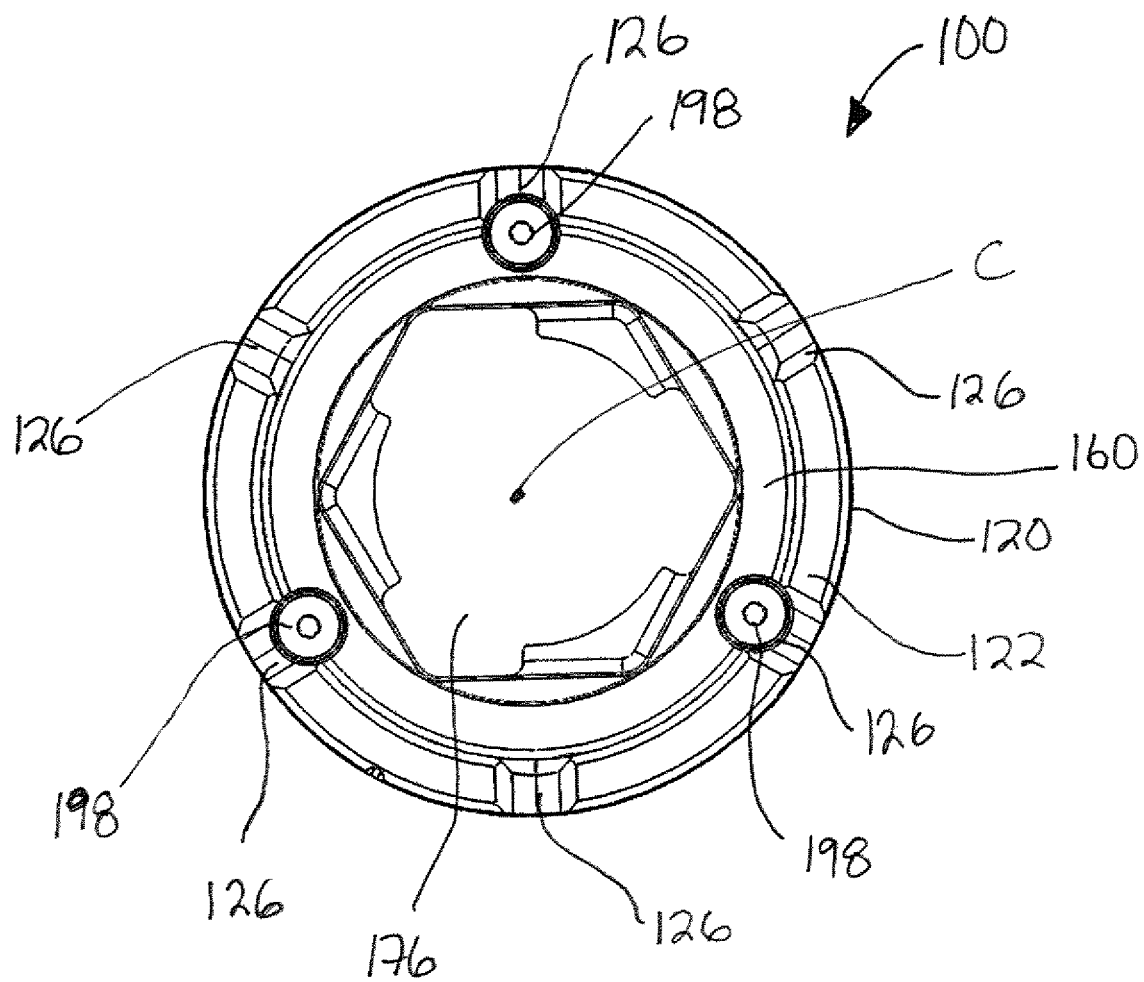
FIG. 7 is a top view of the female connector shown in FIG. 2.

Referring to FIG. 7, the female connector 100 can have an internal passage 176 therethrough, the internal passage 176 running axially relative to the central axis C so that the central axis C passes through the internal passage 176. The electrical components that will be installed in the tubing sections 10 can pass through this internal passage 176 allowing wiring and other components to be run through the female connector 100 and male connector 200 between the tubing sections 10.

Figure 8:
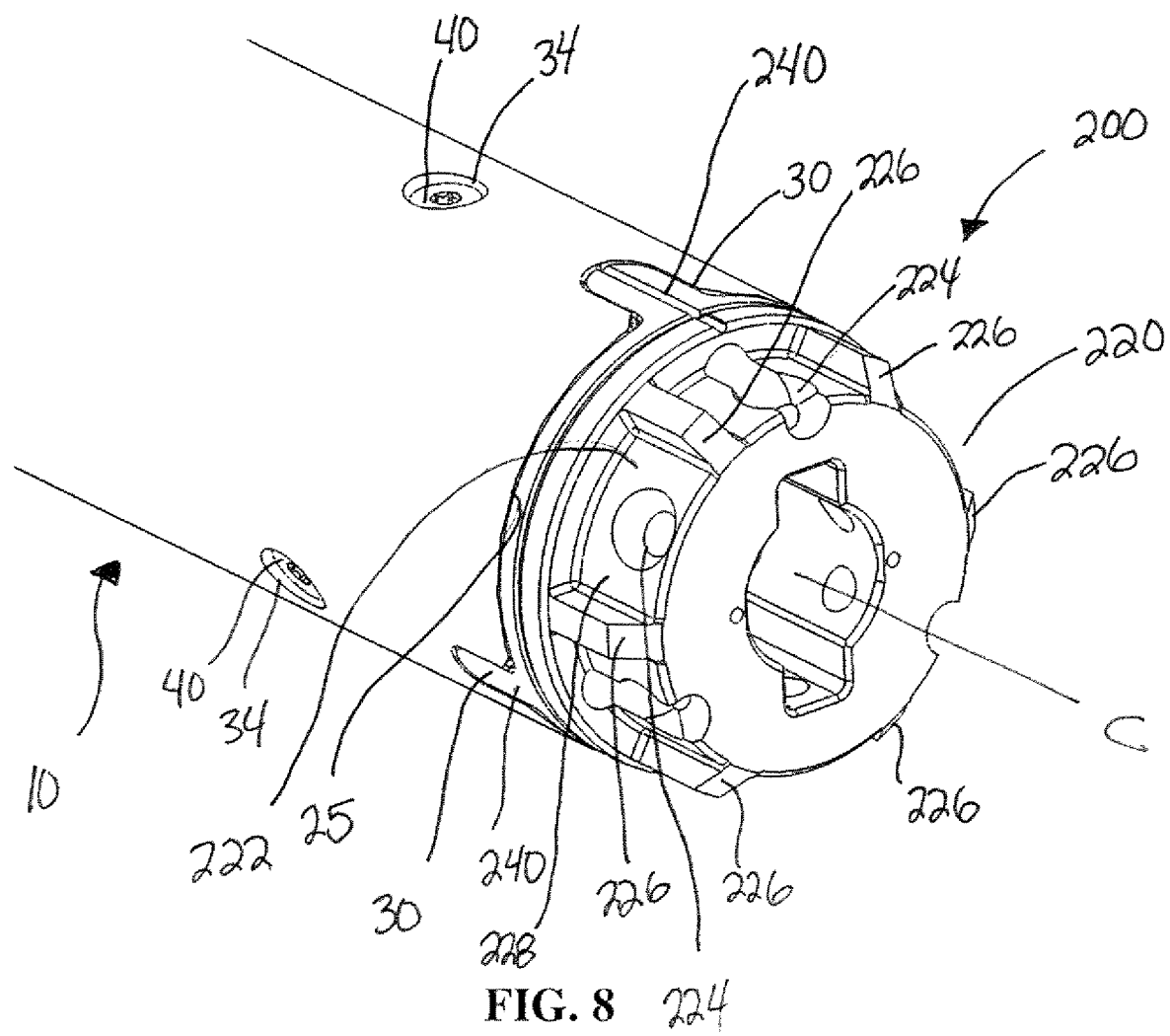
FIG. 8 is a perspective view of a male connector and an end of a tubing section.
Figure 9:
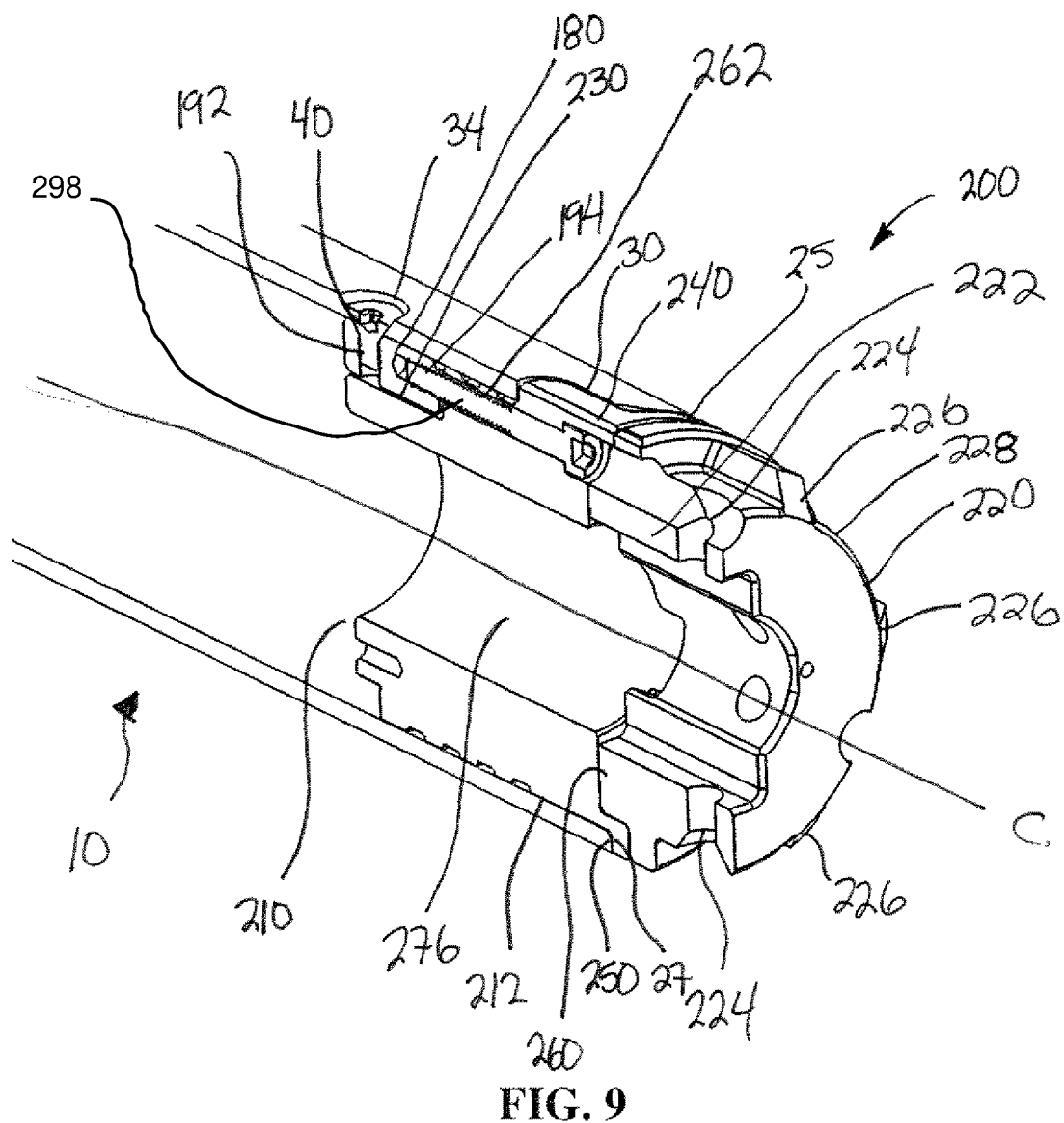
FIG. 9 is a perspective schematic view of the male connector and the end of a tubing section shown in FIG. 8.
Figure 10:
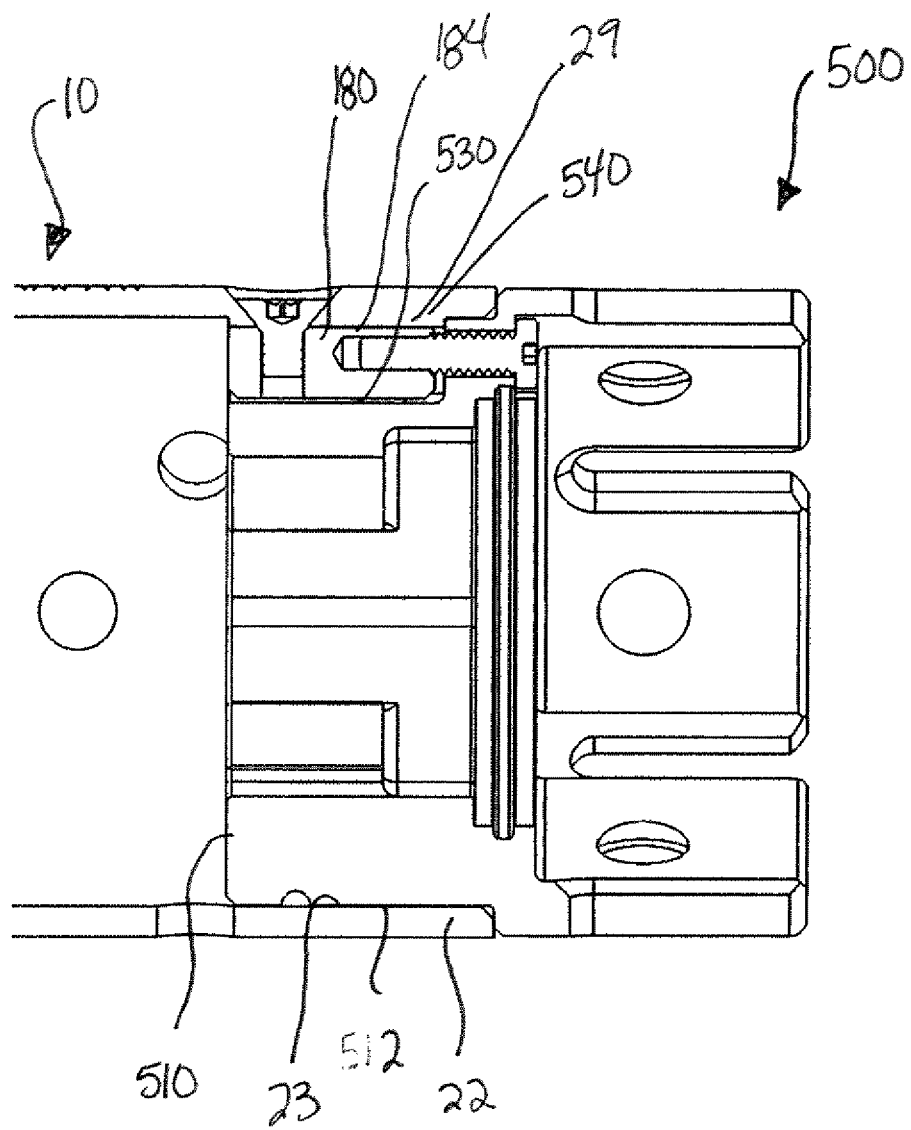
FIG. 10 is a side view of a connector having recessed attachment blocks and a tubing section having protruding ribs corresponding to the recesses formed by the attachment blocks.
Figure 11:
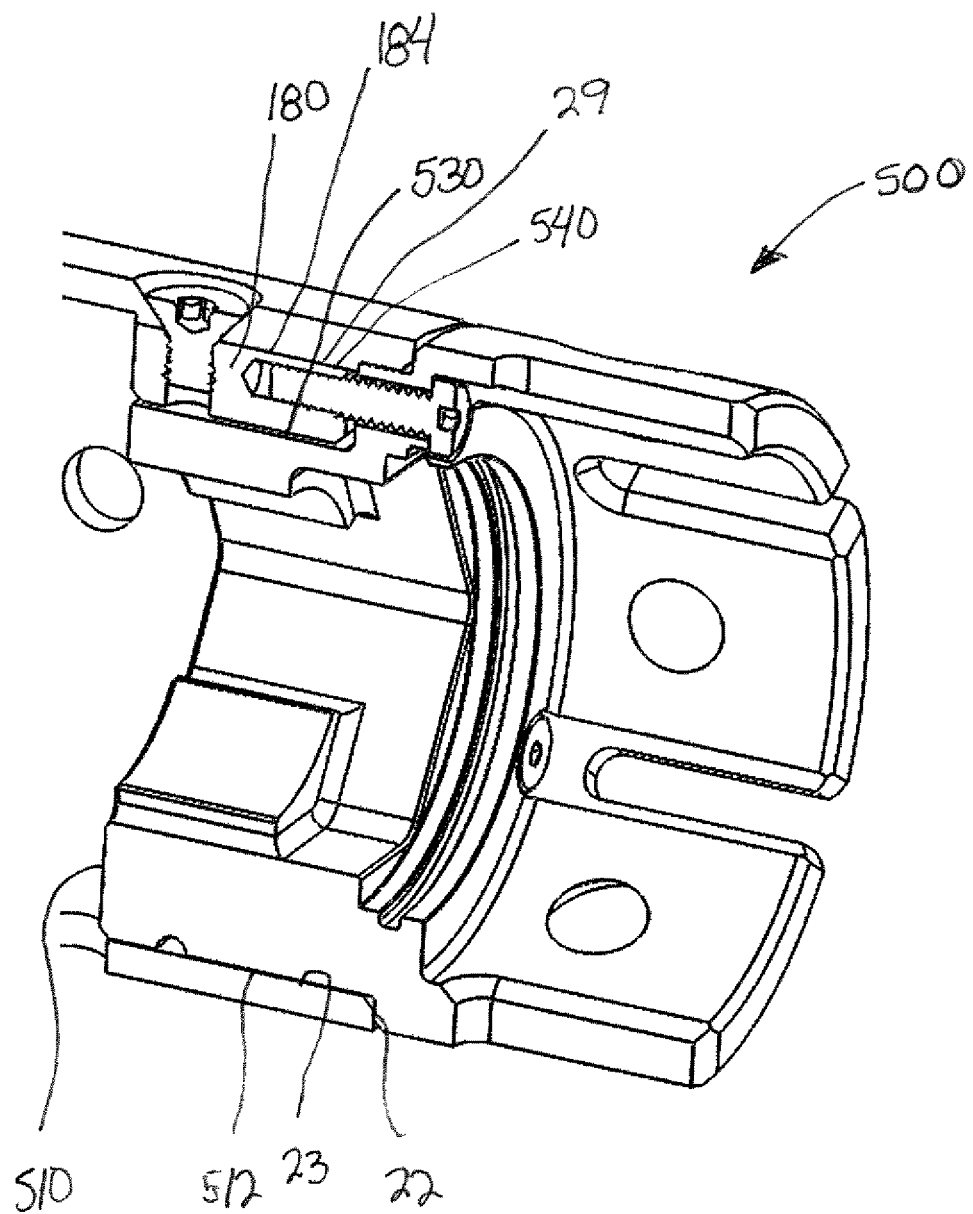
FIG. 11 is a cutaway perspective view of the connector shown in FIG. 10.
Figure 12:
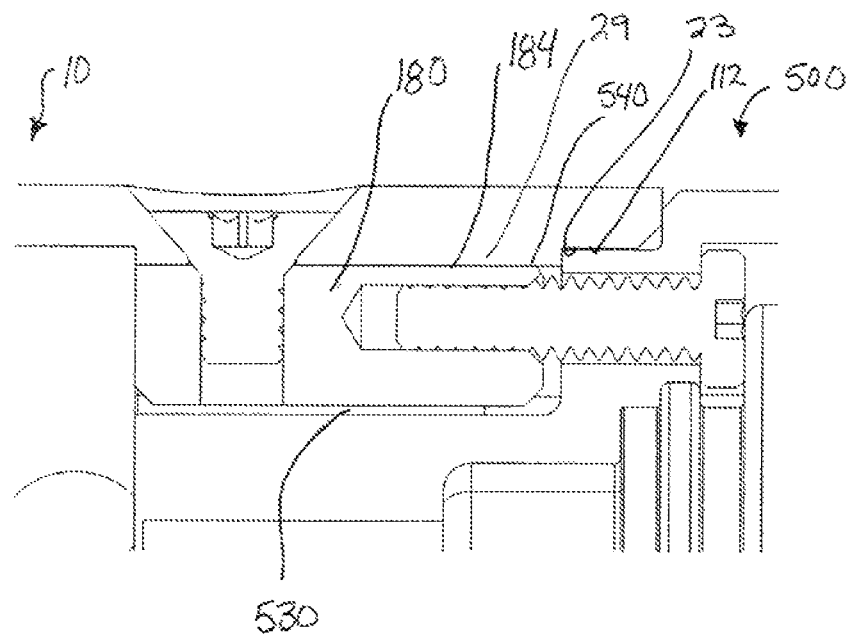
FIG. 12 is a close up view of an attachment block, recess and protruding rib of the connector and tubing section shown in FIG. 10.
Figure 13:
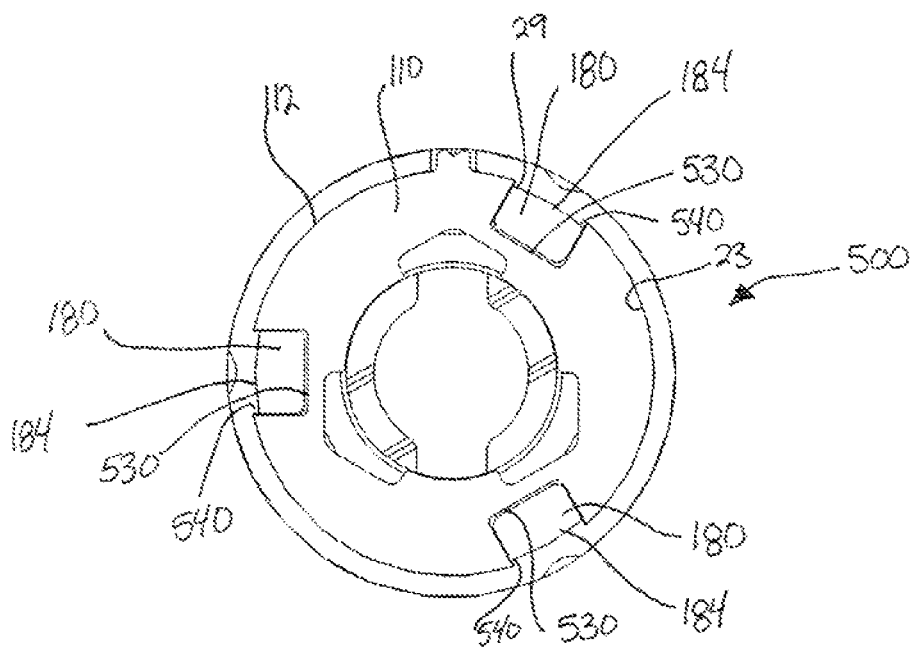
FIG. 13 is a bottom view of the connector and tubing section shown in FIG. 10.
Figure 14:
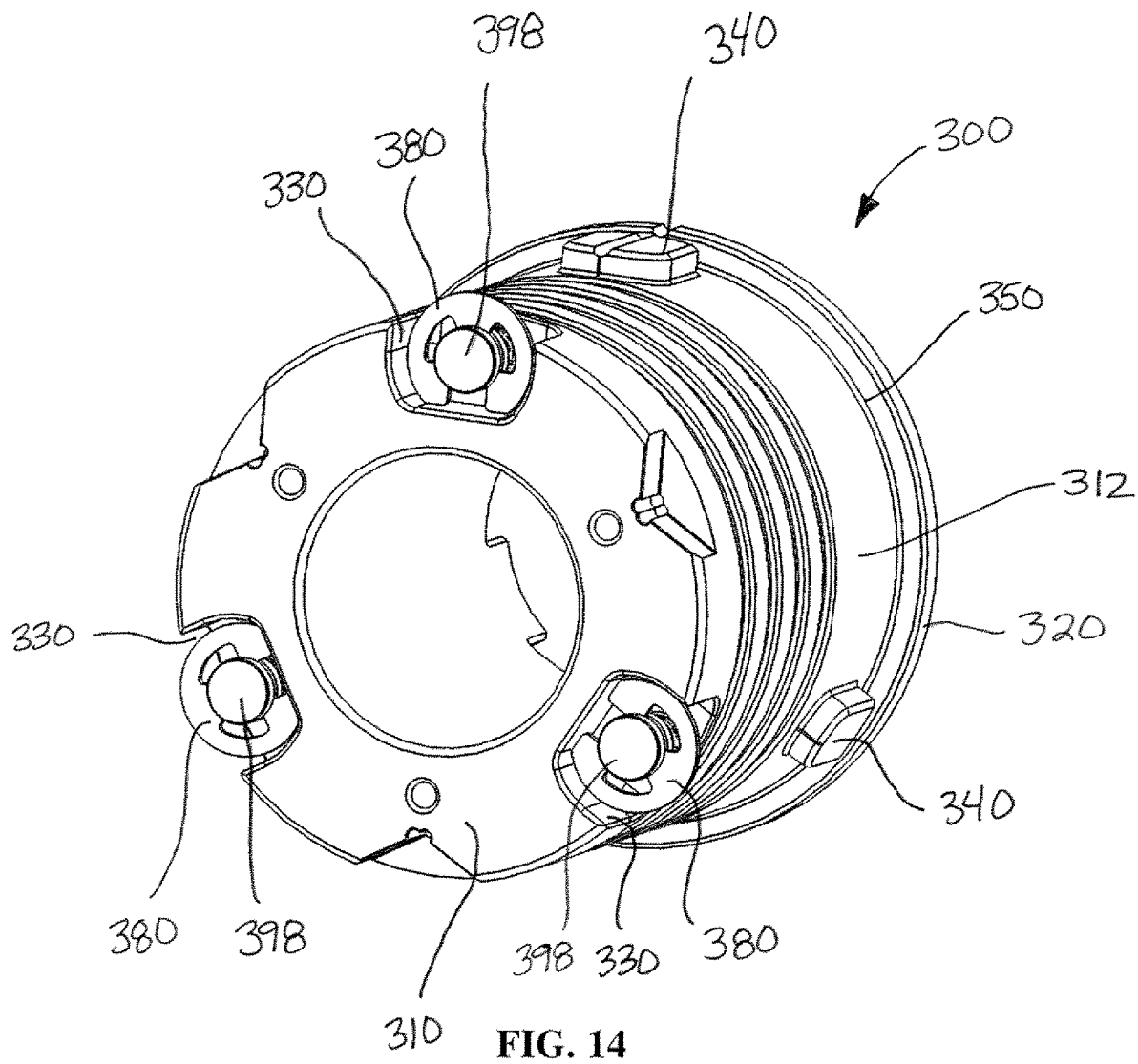
FIG. 14 is a perspective view of a connector for connecting tubing sections together.
Figure 15:
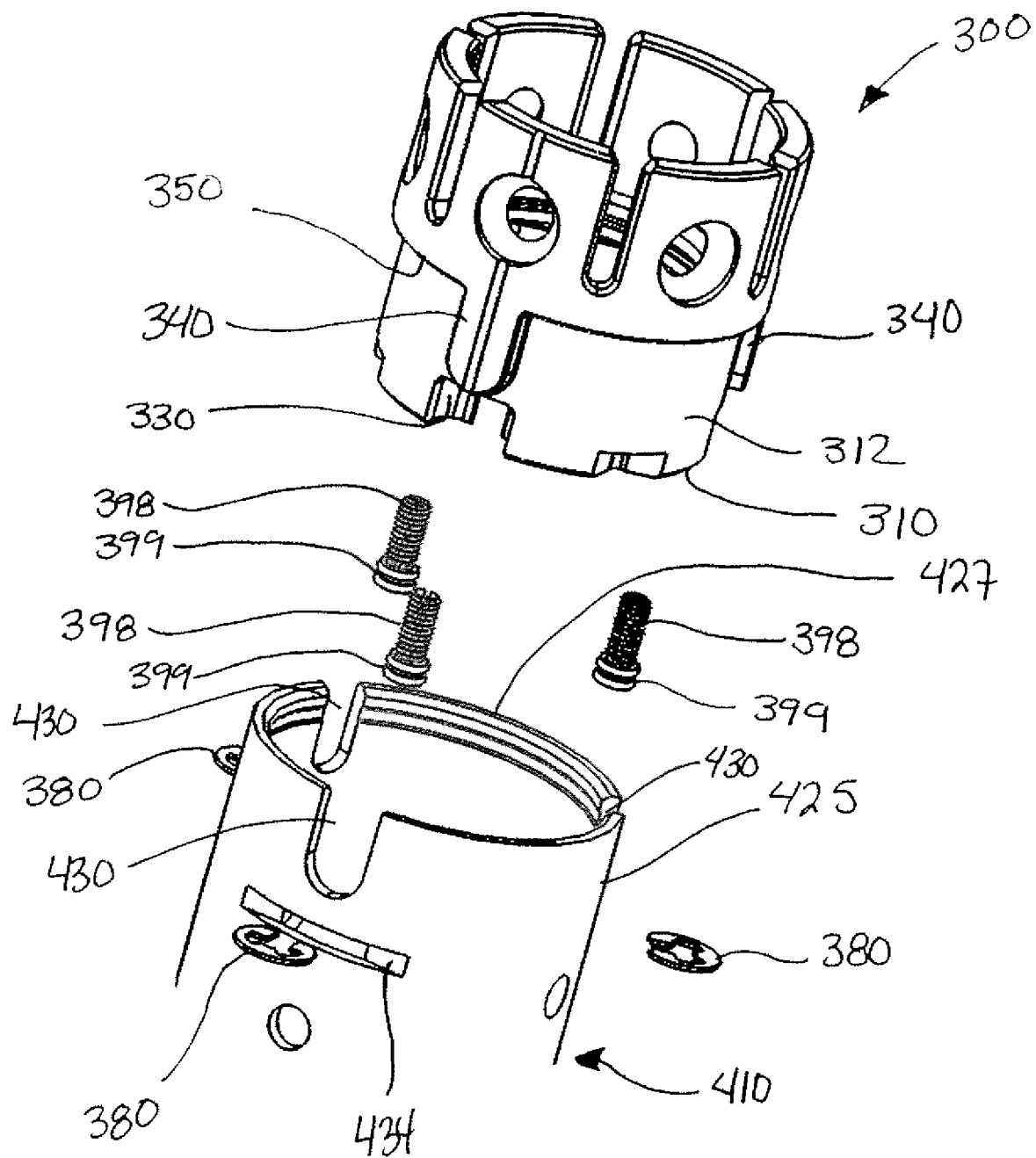
FIG. 15 is a perspective exploded view of the connector shown in FIG. 14 and the end of a tubing section.
Figure 16:
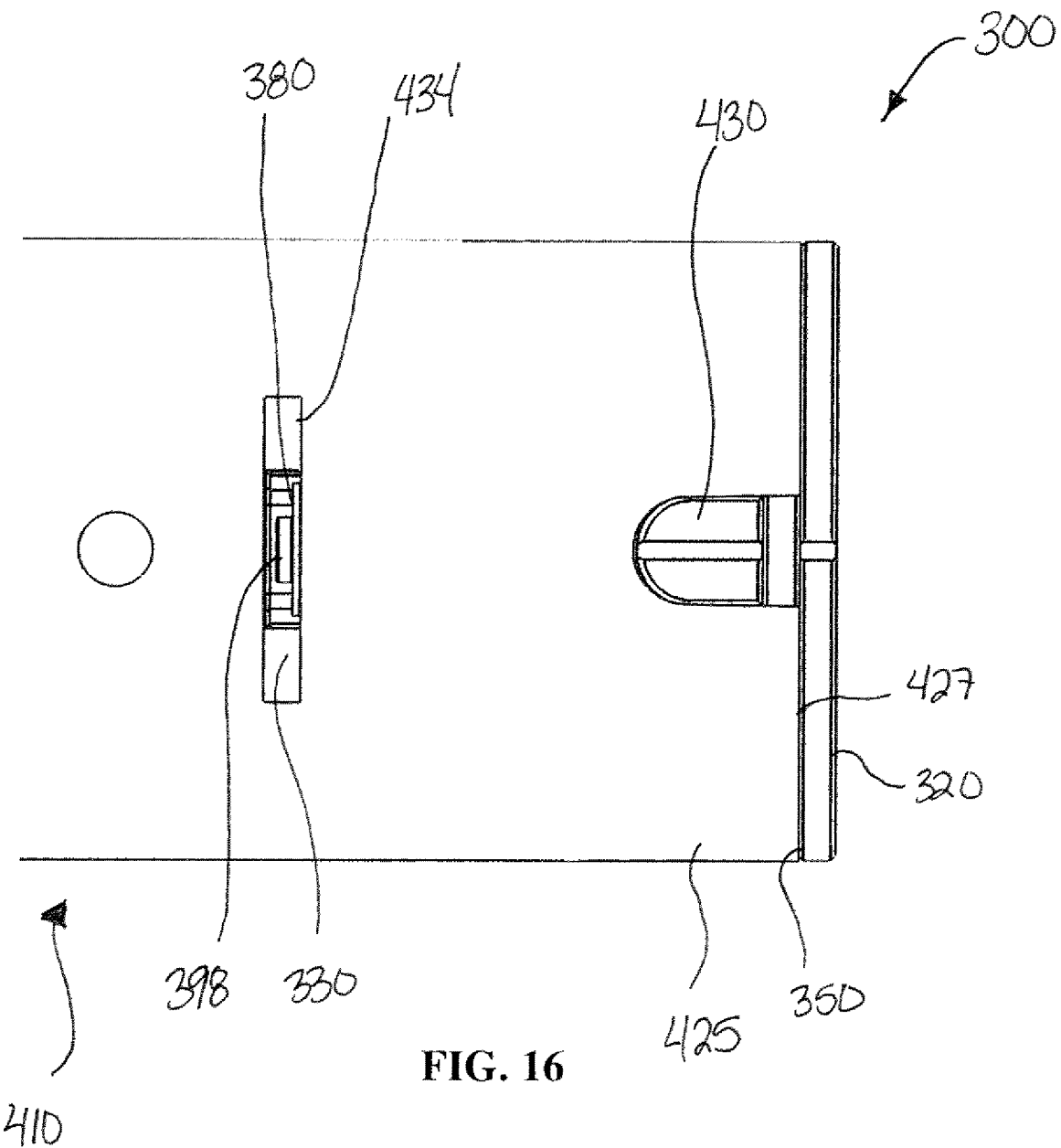
FIG. 16 is a side view of the connector of FIG. 14 in an end of a tubing section.
Figure 17:
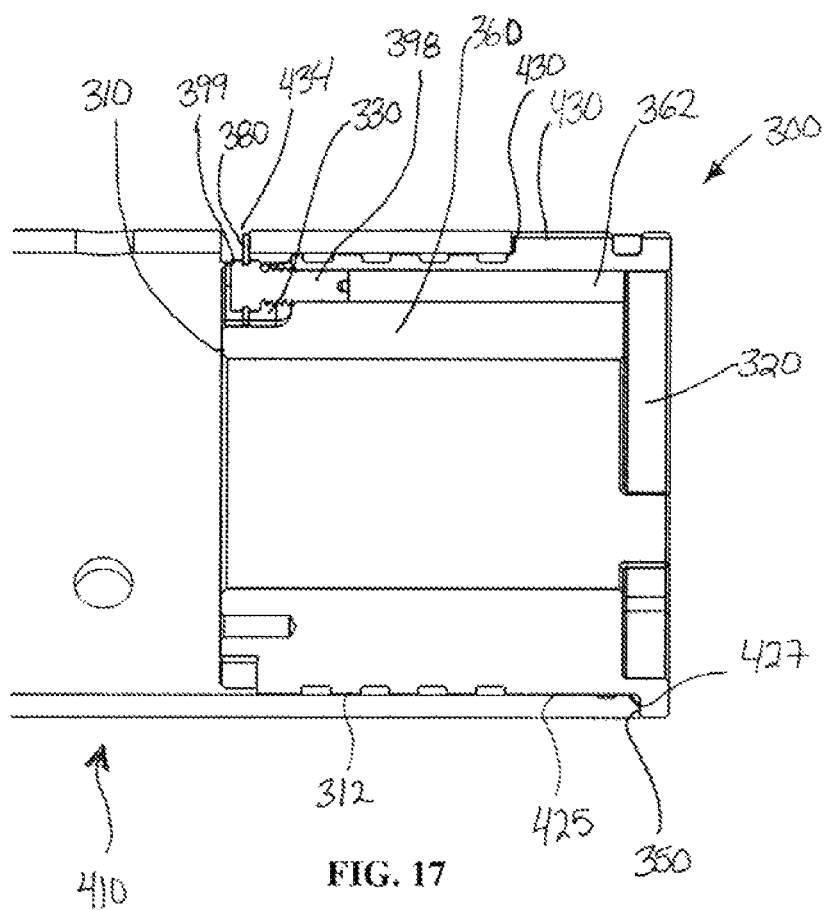
FIG. 17 is a side cutaway schematic view of the connector and end of the tubing section shown in FIG. 16.

The male connector 200 is attachable to an end 25 of a tubing section 10 in a similar manner as the female connector 100. FIGS. 8 and 9 illustrates the male connector 200. The male connector 200 can have a first end 210 adapted for insertion into the end 25 of the tubing section 10 and a second end 220 adapted for connection to the female connector 100.

The first end 210 of the male connector 200 can have an outer diameter slightly less in diameter than the inner diameter of the end 25 of the tubing section 10 so that the first end 210 can be inserted into the end 25 of the tubing section 10.

Optionally, one or more alignment tabs 240 can extend outwards from an outer surface 212 of the first end 210 of the male connector 200 to be used to align the male connector 200 in the end 25 of the tubing section 10. The alignment tabs 240 can correspond to alignment slots 30 in the end 25 of the tubing section 10 to properly position the male connector 200 relative to the end 25 of the tubing section 10.

The first end 210 of the male connector 200 can have a number of attachment block slots 230 sized to fit attachment blocks 180, as shown in FIGS. 4 and 5, in these attachment block slots 230. The attachment block slots 230 are sized and positioned so that the attachment blocks 180 can be positioned inside these attachment block slots 230. The attachment block slots 230 can be sized so that the attachment blocks 180 can move axially relative to the central axis, C, of the tubing section 10 when the male connector 200 is provided in the end 25 of the tubing section 10.

Like the female connector 100, there can be as few as a single attachment block slot 230 in the first end 210 of the male connector 200 and corresponding attachment block 180 but in one aspect three substantially equidistantly spaced attachment block slots 230 and corresponding attachment blocks 180 can be provided. There can also be more than three attachment block slots 230 and corresponding attachment blocks 180.

Referring to FIGS. 4 and 5 illustrates an attachment block 180. Each attachment block 180 is sized to slide in the attachment block slot 230 and can have an inner surface 182, outer surface 184, top surface 186, bottom surface 188 and side surfaces 190. When the attachment block 180 is positioned in the attachment block slot 230 in the outer surface 212 of the first end 210 of the male connector 200, the inner surface 182 will face inwards in the attachment block slot 230 towards the first end 210 of the male connector 200 and the outer surface 184 will face outwards from the male connector 200 and towards the inside of the end 25 of the tubing section 10 when the first end 210 of the male connector 200 is slid inside the end 25 of the tubing section 10.

Referring again to FIGS. 8 and 9, the depth of the attachment block slots 230 can match the thickness of the attachment blocks 180 so that when an attachment block 180 is positioned in the attachment block slot 230, the attachment block 180 does not protrude above the outer surface 212 of the first end 210 of the male connector 200, but instead the outer surface 184 of the attachment block 180 can be substantially flush with the outer surface 212 of the first end 210 of the male connector 200.

The outer surface 184 of the attachment block 180 can also have an outer radius that matches the outer radius of the outer surface 212 of the first end 210 of the male connector 200.

Each attachment block 180 can have a first threaded aperture 192 in the outer surface 184 and a second threaded aperture 194 in the top surface 186. The first threaded aperture 192 can be positioned in the outer surface 184 of the attachment block 180 so that the first threaded aperture 192 will run radially relative to the central axis, C, of the tubing section 10 when the attachment block 180 is positioned in the attachment block slot 230. The second threaded aperture 194 can be positioned in the top surface 186 so that the second threaded aperture 194 runs axial relative to the central axis, C.

The second end 220 of the male connector 200 can be adapted to connect to the second end 120 of the female connector 100. An outer diameter of the second end 220 can be smaller than an inner diameter of the second end 120 of the female connector 100 so that the second end 220 of the male connector 200 can be inserted into the second end 120 of the female connector 100.

The second end 220 of the male connector 200 can have a number of connection ribs 226 extending radially from an outer surface 228 of the second end 220 of the male connector 200. These connection ribs 226 on the second end 220 of the male connector 200 can correspond with the positioning slots 126 on the second end 120 of the female connector 200.

The second end 220 can have a number of threaded apertures 224 passing into the walls 222 of the second end 220 of the male connector 200 so that screws (not shown) can be inserted through the connection apertures 124 in the second end 120 of the female connector 100 and threaded into the threaded apertures 224 on the second end 220 of the male connector 200 to secure the female connector 100 and the male connector 200 together and connect the two sections of tubing 10.

The threaded apertures 224 and the connection ribs 226 can be positioned so that when the connection ribs 226 are inserted in the positioning slots 126 on the second end 120 of the female connector 100, the connection apertures 124 in the second end 120 of the female connector 100 can be aligned with the threaded apertures 224 in the second end 220 of the male connector 200.

An outer shoulder 250 can be provided in the male connector 200 where the first end 210 of the male connector 200 can come into contact with a top edge 27 of the end 25 of the tubing section 10 with the rest of the first end 210 being inserted inside the inside diameter of the end 25 of the tubing section 10.

The second end 220 of the male connector 200 can be connectable to the first end 210 of the male connector 200 so that the first end 210 and the second end 220 of the male connector 200 are made of separate pieces. A receptacle 260 can be provided in the first end 210 of the male connector 200 so that the first end 210 of the male connector 200 can be connected to the first end 210 in the receptacle 260. To secure the second end 220 in place in the end 25 of the tubing section 10, the second end 220 of the male connector 200 can be removed from the first end 210 exposing axial screw apertures 262 provided in the receptacle 260 of the first end 210 and oriented axially relative to the center axis, C. The axial screw apertures 262 can be positioned over top of the attachment block slots 230 so that they pass through the first end 210 of the male connector 200 and into the attachment block slots 230. Each axial screw aperture 262 can be positioned so that when an attachment block 180 is positioned in the attachment block slot 230, the axial screw aperture 262 and the second threaded aperture 194 in the attachment block 180 can be aligned so that an axial screw 298 can be inserted through the axial screw apertures 262 in the first end 210 of the male connector 200 and into the second threaded aperture 194 in the attachment block 180.

The end 25 of the tubing section 10 can have a number of radial apertures 34 passing therethrough. These radial apertures 34 can be positioned to align with the first threaded apertures 192 in the attachment blocks 180 when the attachment blocks 180 are positioned in the attachment block slots 230. Because the attachment blocks 180 can move axially in the attachment block slots 230 relative to the central axis C, the radial apertures 34 have to be positioned at the proper positions around the circumference of the end 25 of the tubing section 10 so that they will align with the first threaded apertures 192 in the attachment blocks 180 in the attachment block slots 230. However, the positioning of the radial apertures 34 axially relative central axis C can vary a bit because the attachment block 180 can move axially in the attachment block slot 230 to accommodate some discrepancy in their axial positioning. In this manner, the distance of the radial apertures 34 from the top edge 27 of the end 25 of the tubing section 10 can vary a bit and still not create problems for attaching the male connector 200 to the end 25 of the tubing section 10.

The radial apertures 34 can be of a frusto-conical shape so that a head 42 of a radial screw 40 inserted through the radial aperture 34 can be countersunk to prevent the head 42 of the radial screw 40 extending above the outer surface of the end 25 of the tubing section 10.

The male connector 200 can have an internal passage 276 therethrough, the internal passage 276 running axially relative to the central axis C so that the central axis C passes through the internal passage 276. The electrical components that will be installed in the tubing sections 10 can pass through this internal passage 276 allowing wiring and other components to be run through the male connector 200 and female connector 100 between the tubing sections 10.

In operation, the female connector 100 can be secured to the end 20 of the tubing section 10 by inserting the attachment blocks 180 in the attachment block slots 130 and using axial screw 198 to hold the attachment blocks 180 in the attachment block slots 130. The axial screws 198 can be inserted through the axial screw apertures 162 in the inner shoulder 160, into the attachment block slots 130 and into the second threaded apertures 194 in the top surface 186 of the block 180. The axial screws 198 do not have to be tightened completely in the second threaded apertures 194, but rather can just be partially threaded into the second threaded apertures 194 in the attachment blocks 180 to simply hold the attachment blocks 180 in the attachment block slots 130 for assembly.

With the attachment blocks 180 held in the attachment block slots 130 in the first end 110 of the female connector 100, the attachment blocks 180 and the first end 110 of the female connector 100 can be inserted into the end 20 of the tubing section 10. If the first end 110 of the female connector 100 has alignment tabs 140, the alignment tabs 140 can be slid into the alignment slots 30 in the end 20 of the tubing section 10 to line up the radial apertures 24 in the end 20 of the tubing section 10 with the first threaded apertures 192 in the attachment blocks 180.

Radial screws 40 can then be inserted through the radial apertures 24 in the end 20 of the tubing section 10 and into the first threaded apertures 192 in the attachment blocks 180. The attachment blocks 180 might have to be moved axially in the attachment block slots 130 so that the first threaded apertures 192 align with the radial apertures 24 in the end 20 of the tubing section 10. These radial screws 40 can be tightened radially in the first threaded apertures 192 in the attachment blocks 180 to secure the end 20 of the tubing section 10 against the outer surface 112 of the first end 110 of the female connector 100. With the radial screws 40 tightened in the first threaded apertures 192, the radial screws 40 can be positioned radially relative to the central axis C.

The axial screws 198 can then be tightened in the second threaded apertures 194 in the attachment blocks 180 to force the female connector 100 axially against a top edge 22 of the end 20 of the tubing section 10. This can allow a pre-load to be created between the female connector 100 and the top edge 22 of the end 20 of the tubing section 10.

In a similar manner, the male connector 200 can be secured to the end 25 of the tubing section 10 by inserting the attachment blocks 180 in the attachment block slots 230 and using axial screws 298 to hold the attachment blocks 180 in the attachment block slots 230. The axial screws 298 can be inserted through the axial screw apertures 162 in the male connector 200 and into the attachment block slots 230 and into the second threaded aperture 194 in the top surface 186 of the block 180. The axial screws 298 do not have to be tightened completely in the second threaded apertures 194, but rather can just be partially threaded into the second threaded apertures 194 in the attachment block 180 to simply hold the attachment blocks 180 in the attachment block slots 230.

With the attachment blocks 180 held in the attachment block slots 230 in the first end 210 of the male connector 200, the attachment blocks 180 and the first end 210 of the male connector 200 can be inserted into the end 25 of the tubing section 10. If the first end 210 of the male connector 200 has alignment tabs 240, the alignment tabs 240 can be slid into the alignment slots 30 in the end 25 of the tubing section 10 to line up the radial apertures 34 in the end 25 of the tubing section 10 with the first threaded apertures 192 in the attachment blocks 180.

Radial screws 40 can then be inserted through the radial apertures 34 in the end 25 of the tubing section 10 and into the first threaded apertures 192 in the attachment blocks 180. The attachment blocks 180 might have to be moved axially in the attachment block slots 230 so that the first threaded apertures 192 align with the radial apertures 34 in the end 25 of the tubing section 10. These radial screws 40 can be tightened radially in the first threaded apertures 192 in the attachment blocks 180 to secure the end 25 of the tubing section 10 against the outer surface 212 of the first end 210 of the male connector 200. With the radial screws 40 tightened in the first threaded apertures 192, the radial screws 40 can be positioned radially relative to the central axis C.

The axial screws 298 can then be tightened in the second threaded apertures 194 in the attachment blocks 180 to force the male connector 200 axially against a top edge 27 of the end 25 of the tubing section 10. This can allow a pre-load to be created with the male connector 200 against the top edge 27 of the end 25 of the tubing section 10.

With the female connector 100 secured to the end 20 of a first tubing section 10 and the male connector 200 secured to the end 25 of a second tubing section 10, the female connector 100 and the male connector 200 can be connected together to join the two sections of tubing 10. The second end 220 of the male connector 200 can be slid inside the second end 120 of the female connector 100. The connection ribs 226 on the male connector 200 can be slid into the corresponding positioning slots 126 on the female connector 200 to cause the threaded apertures 224 in the second end 220 of the male connector 200 to align with the connection apertures 124 in the second end 120 of the female connectors 100. Screws can then be passed through the connection apertures 124 in the second end 120 of the female connectors 100 and threaded into the threaded apertures 224 in the second end 220 of the male connector 200 to secure the male connector 100 and female connector 200 together, thereby connecting the two sections of tubing 10 together.

Referring to FIG. 14-17, in a further aspect, a connector 300 can be used that uses axial screws to preload the connector against the end 425 of a tubing section 410, however, retaining clips 380 can be used to secure the connector 300 in place in the end 425 of the tubing section 410 and then axial screws 398 used to preload the connector 300 axially against the end 425 of the tubing section 410.

The connector 300 can have a first end 310 adapted for insertion into the end 425 of the tubing section 410 and a second end 320 for connection to another connector 300. The first end 310 of the connector 300 can have an outer diameter slightly less in diameter than an inner diameter of the end 425 of the tubing section 410 so that the first end 310 can be inserted into the end 425 of the tubing section 410.

Optionally, one or more alignment tabs 340 can extend outwards from an outer surface 312 of the first end 310 of the connector 300 to be used to align the connector 300 in the end 425 of the tubing section 410. The alignment tabs 340 can correspond to alignment slots 430 in the end 425 of the tubing section 410 to properly position the connector 300 relative to the end 425 of the tubing section 410.

The first end 310 of the connector 300 can have a number of attachment slots 330 sized to fit the ends of the axial screws 398 and the retaining clips 380 in the attachment slots 330. The attachment slots 330 can be sized so that a retaining clip 380 can be inserted partially into the attachment slot 330 and secured around the end 399 of the axial screw 398. However, the attachment slot 330 can be sized so that the retaining clip 380 cannot be completely inserted inside the attachment slot 330, but rather, a portion of the retaining clip 380 extends beyond the outer surface 312 of the first end 310 of the connector 300 to engage with the end 425 of the tubing 410. Alternatively, the attachment slot 330 can be sized large enough to receive most if not all of the retaining clip 380, however, the positioning of the axial screw 398 in the retaining slot 330 causes a portion of the retaining clip 380 to extend beyond an outer surface 312 of the first end 310 of the connector 300.

In one aspect, the retaining clip 380 can be a c-clip.

In one aspect, the attachment slot 330 can be a truncated c-shape to match the shape of the retaining clip 380 which is a c-shaped retaining clip. The truncated c-shape will allow a portion of the retaining clip 380 to extend beyond an outer surface 312 of the first end 310 of the connector 300 and engage with the end 425 of the tubing section 410.

Figure 20:
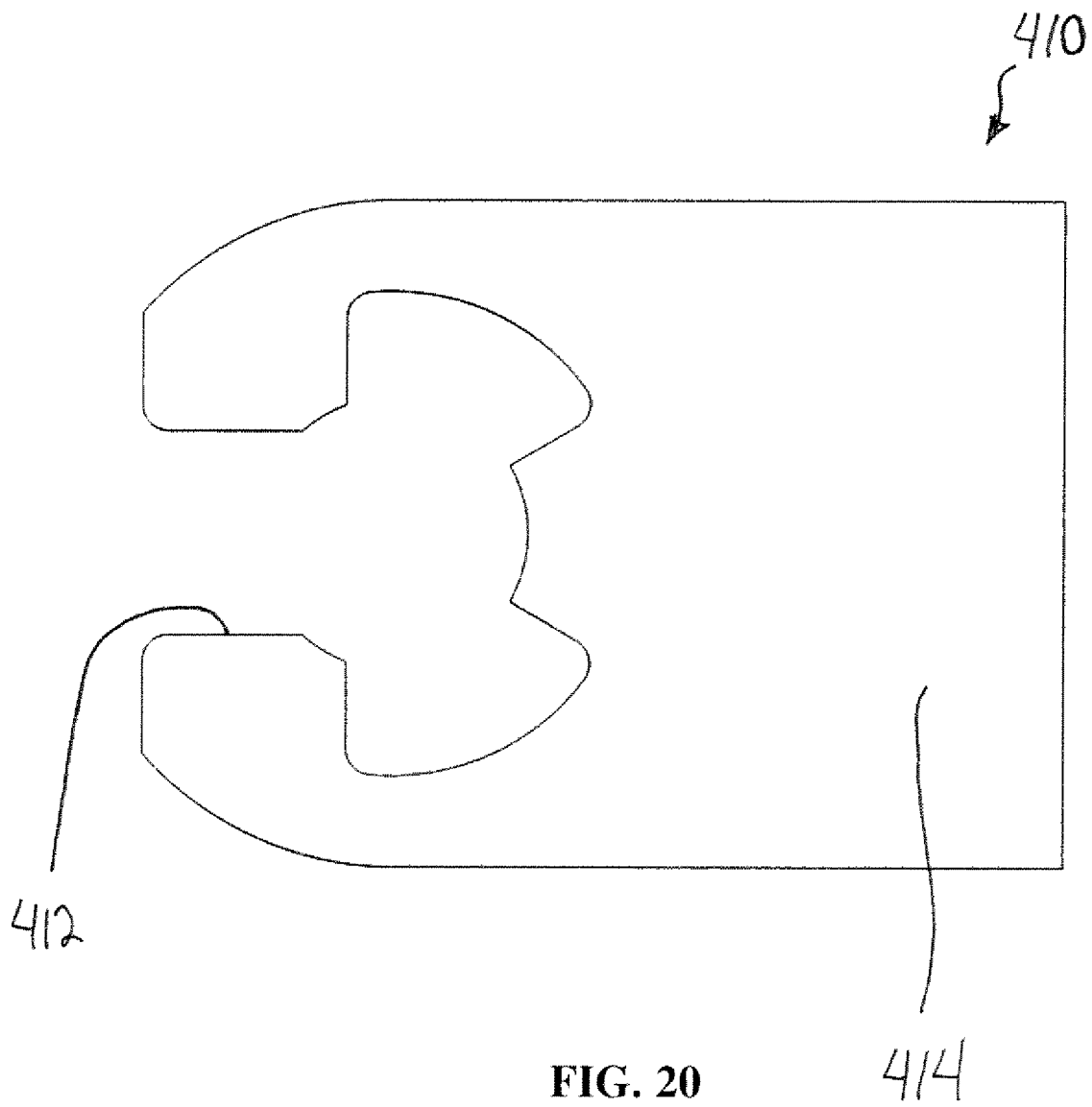
FIG. 20 is an illustration of an alternate retainer clip.

Referring to FIG. 20, the retaining clip 380 could have other shapes, such as a c-clip with a clipping portion 412 and an extending tab 414 so that the extending tab 414 can extend beyond the outer surface 312 of the first end 310 of the connector 300

There can be as few as a single attachment slot 330 in the first end 310 of the connector 300, but in one aspect three substantially equidistantly spaced attachment slots 330 can be provided around the circumference of the end 425 of the tubing section 410. There can also be more than three attachment slots 330.

An outer shoulder 350 can be provided in the connector 300 above the first end 310 of the connector 300. The outer shoulder 350 can be sized to sit on top of a top edge 427 of the end 425 of the tubing section 410. The outer diameter of the connector 300 below the outer shoulder 350 can be slightly smaller than the inner diameter of the end 425 of the tubing section 410 while the outer diameter of the connector above the outer shoulder 350 can be sized to be substantially the same as the outer diameter of the end 425 of the tubing section 410 so that the outer diameter of the connector 300 above the outer shoulder 350 can sit substantially flush with the outer diameter of the end 425 of the tubing section 410.

An inner shoulder 360 can also be provided inside the connector 300. The inner shoulder 360 can extend over the smaller first end 310 of the connector 300. A number of axial screw apertures 362 can be provided in the inner shoulder 360 above the attachment slots 330 and passing through the inner shoulder 360, the first end 310 and into the attachment slots 330.

The end 425 of the tubing section 410 can have a number of radial slots 434 passing therethrough and sized to allow retaining clips 380 to pass through these radial slots 434. These radial slots 434 can be positioned to align with the aperture slots 330 in the first end 310 of the connector 300 so that a retainer clip 380 can be inserted through the radial slot 434 and attached around the end 399 of the axial screw 398 extending into the attachment slot 330. A portion of the retaining clip 380 will extend beyond an outer surface 312 of the first end 310 of the connector 300 and into the radial slot 434 to secure the connector 300 in the end 425 of the tubing section 410. In one aspect, the retaining clip 380 is sized to extend into the radial slot 434 but not past the radial slot 434 and an outer surface of the end 425 of the tubing section 410.

Figure 18:
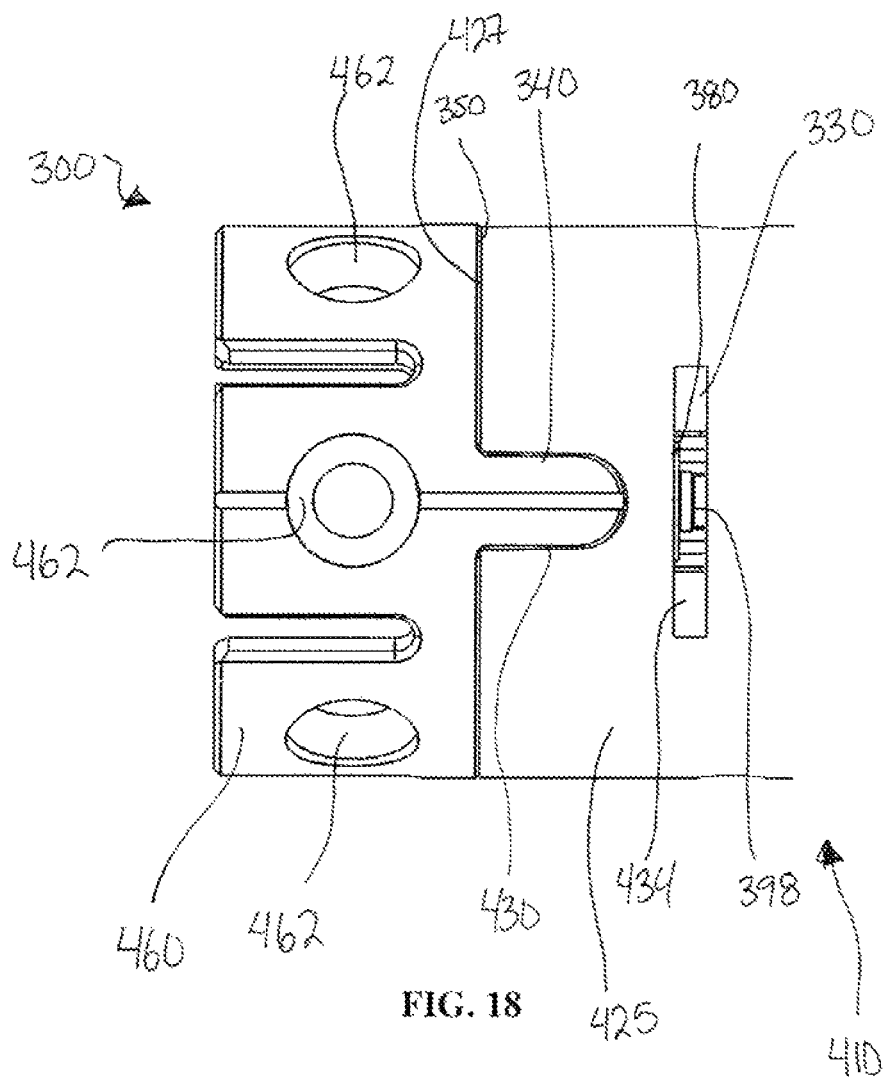
FIG. 18 is a side view of a female connector attached to the connector shown in FIG. 14.
Figure 19:
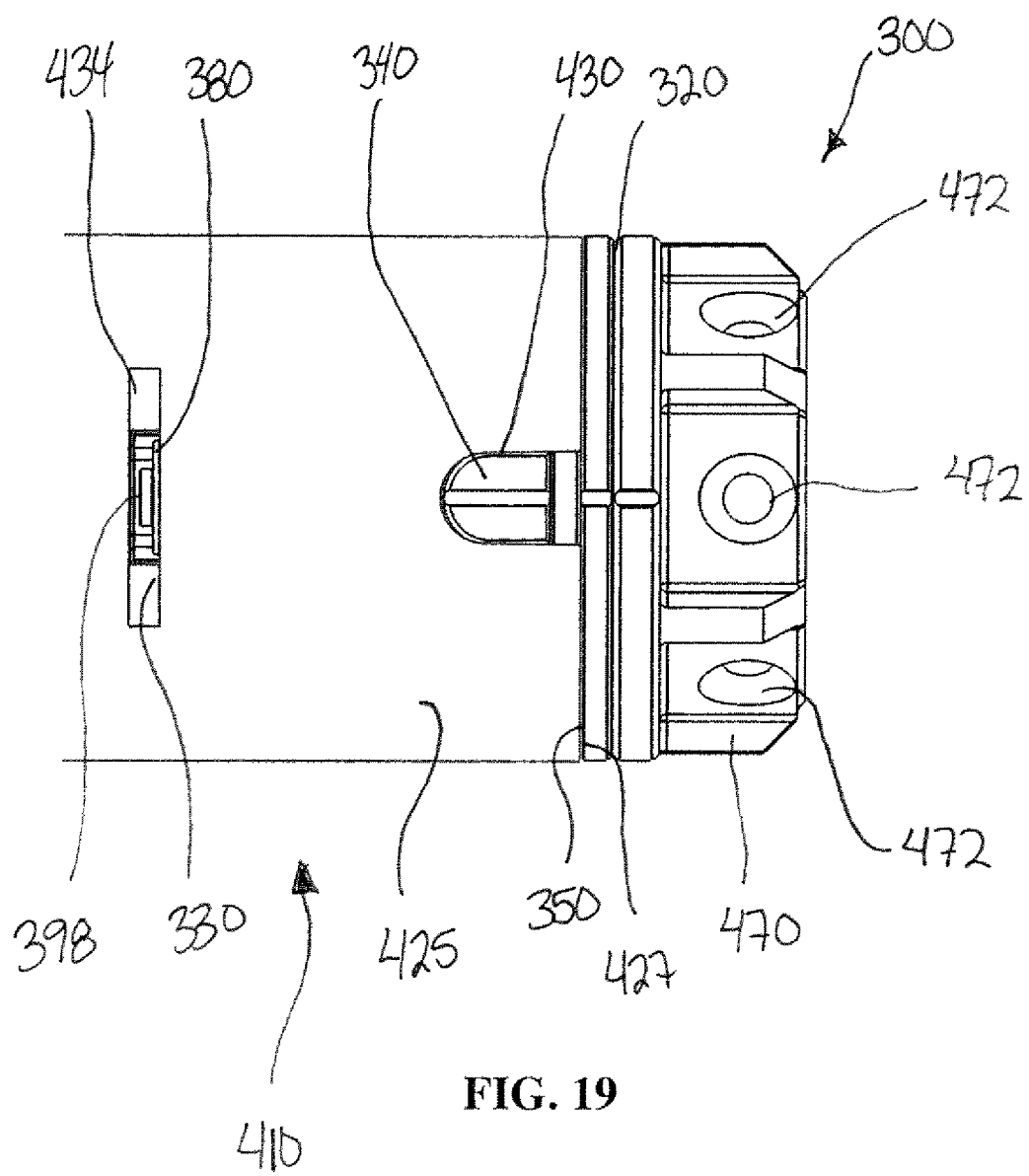
FIG. 19 is a perspective view of a male attached to the connector shown in FIG. 14.

Similar to the female connector 100 and the male connector 200, the connector 300 can be adapted to receive either a male second end or a female second end. FIG. 18 shows the connector 300 with a female end 460 attached and FIG. 19 shows the connector 300 with a male end 470 attached. The connector 300 can be formed so that the female end 460 and the male end 470 are attachable to the connector 300 or they could be formed as one piece with male and female connectors 300. In this manner, a connector 300 with the male end 470 can be connected to another connector 300 with the female end 460 attached. The female end 460 and the male end 470 can have a number of threaded apertures 462, 472, respectively, passing through the walls of the ends so that a male end 470 can be connected to a female end 460 and then screws (not shown) can be threaded into the threaded apertures 462, 472 to secure the two connectors 300 together.

Referring again to FIGS. 14-19, in operation, the connector 300 can be secured to the end 425 of the tubing section 410 by inserting the axial screws 398 in the axial screw apertures 362 and threading them in place so that the ends 399 of the axial screws 398 extend out into the attachment slots 330.

With the axial screws 398 inserted into the axial screw apertures 362, the first end 310 of the connector 300 can be inserted into the end 425 of the tubing section 410. If the first end 310 of the connector 300 has alignment tabs 340, the alignment tabs 340 can be slid into the alignment slots 430 in the end 425 of the tubing section 410 to line up the radial apertures 24 in the end 20 of the tubing section 10 with the first threaded apertures 192 in the attachment blocks 180.

The axial screws 398 should not be tightened completely in the axial screw apertures 362, but rather, the end 399 of the axial screw 398 should extend far enough into the attachment slot 330 so that end 399 of the axial screw 398 is aligned with the radial slot 434 in the end 425 of the tubing section 410.

The retaining clips 380 can then be inserted through the radial slots 434 and clipped onto the end 399 of the axial screws 398. Because the retaining clips 380 do not apply any force to the outside of the end 425 of the tubing section 410 they will not cause the end 425 of the tubing section 410 to be bent or distorted.

The axial screw 398 can then be tightened in the axial screw apertures 362 to force the connector 300 axially against a top edge 427 of the end 425 of the tubing section 410. This can allow a pre-load to be created between the connector 300 and the top edge 427 of the end 425 of the tubing section 410.

The connector 300 can then be connected to another connector 300 in the end of another tubing section. For example, a connector 300 connected to an end 425 of a tubing section 410 having a male end 470 can be connected to a connector 300 connected to an end 425 of a different tubing section 410 having a female end 460 and vice versa. In this way, the connector 300 can be connected to an end 425 of a section of tubing 410 and then used to connect to another connector 300 attached to another section of tubing 410, thereby connecting the two sections of tubing 410 using the connectors 300.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed:

1. A connector for connecting a tubing section to another tubing section, the connector comprising:
   a first end having an outer surface and adapted for insertion into an end of the tubing section, the first end having an outer diameter less than an inner diameter of the tubing section;
   a second end adapted for connection to a second connector;
   an attachment block having an inner surface, an outer surface and a top surface, a first threaded aperture passing through the outer surface and a second threaded aperture passing through the top surface;
   an attachment block slot provided in the outer surface of the first end and sized to fit the attachment block; and
   an axial screw aperture passing through the first end of the connector and into the attachment block slot;
   wherein the first threaded aperture is oriented substantially radially to a central axis of the connector when the attachment block is positioned in the attachment block slot,
   and wherein the second threaded aperture is oriented substantially axially to the central axis of the connector when the attachment block is positioned in the attachment block slot.

2. The connector of claim 1 further comprising three attachment block slots provided in the outer surface of the first end of the connector and three corresponding attachment blocks, the three attachment block slots provided substantially equidistant around a circumference of the first end of the connector.

3. The connector of claim 1 wherein a depth of the attachment block slot allows the outer surface of the attachment block to be recessed relative to the outer surface of the first end of the connector when the attachment block is positioned in the attachment block slot.

4. The connector of claim 3 wherein the recess formed above the outer surface of the attachment block corresponds with a protruding rib on an inside surface of the end of the tubing section.

5. The connector of claim 1 wherein an outer diameter of the second end is substantially the same as an outer diameter of the end of the tubing section.

6. The connector of claim 1 further comprising at least one alignment tab extending outwards and from the outer surface of the first end of the connector, the at least one alignment tab positioned to correspond with at least one alignment slot in the end of the tubing section.

7. The connector of claim 1 wherein the second end of the connector is a female end adapted to connect with a male end of a second connector and wherein the second end further comprises a plurality of connection apertures passing substantially radially relative to the central axis of the connector in a wall of the second end of the connector.

8. The connector of claim 7 wherein positioning slots are provided in the second end of the connector.

9. The connector of claim 1 wherein the second end of the connector is a male end adapted to connect with a female end of a second connector and wherein the second end of the connector further comprises threaded apertures passing substantially radially relative to the central axis of the connector in a wall of the second end of the connector.

10. The connector of claim 9 wherein the second end of the connector has a plurality of connection ribs extending radially from an outer surface of the second end of the connector.

11. The connector of claim 1 wherein the second end of the connector is inserted in a receptacle in the first end to attach the second end of the connector to the first end of the connector.

12. The connector of claim 1 wherein the axial screw aperture in the first end of the connector aligns with the second threaded aperture in the top surface of the attachment block when the attachment block is inserted in the attachment block slot.

13. The connector of claim 1 wherein an internal passage passes through the connector along the central axis.

14. A connection system for connecting a first tubing section and a second tubing section together, the connection system comprising:
    a first connector comprising:
        a first end having an outer surface and adapted for insertion into an end of a first tubing section, the first end having an outer diameter less than an inner diameter of the first tubing section;
        a female end;
        an attachment block having an inner surface, an outer surface and a top surface, a first threaded aperture passing through the outer surface and a second threaded aperture passing through the top surface;
        an attachment block slot provided in the outer surface of the first end and sized to fit the attachment block; and
        an axial screw aperture passing through the first end of the first connector and into the attachment block slot;
        wherein the first threaded aperture is oriented substantially radially to a central axis of the first connector when the attachment block is positioned in the attachment block slot,
        and wherein the second threaded aperture is oriented substantially axially to the central axis of the first connector when the attachment block is positioned in the attachment block slot;
    a second connector comprising:
        a first end having an outer surface and adapted for insertion into an end of the second tubing section, the first end having an outer diameter less than an inner diameter of the second tubing section;
        a male end adapted for connection to the female end of the first connector;
        an attachment block having an inner surface, an outer surface and a top surface, a first threaded aperture passing through the outer surface and a second threaded aperture passing through the top surface;
        an attachment block slot provided in the outer surface of the first end and sized to fit the attachment block; and
        an axial screw aperture passing through the first end of the second connector and into the attachment block slot;
        wherein the first threaded aperture is oriented substantially radially to a central axis of the second connector when the attachment block is positioned in the attachment block slot,
        and wherein the second threaded aperture is oriented substantially axially to the central axis of the second connector when the attachment block is positioned in the attachment block slot.

15. The connection system of claim 14 wherein the female end of the first connector further comprises a plurality of connection apertures passing substantially radially relative to the central axis of the first connector in a wall of the second end of the first connector and wherein the second end of the second connector further comprises threaded apertures passing substantially radially relative to the central axis of the second connector in a wall of the second end of the second connector and wherein the connection apertures on the first connector align with the threaded apertures in the second end of the second connector when the first connector and second connector are connected.

16. The connection system of claim 14 wherein the female end of the first connector further comprises positioning slots in the second end, and wherein the second end of the second connector further comprises connection ribs extending radially from an outer surface of the second end, and wherein the positioning slots on the first connector align with the connection ribs on the second connector when the first connector and the second connector are connected.

17. The connection system of claim 14 wherein the first connector further comprises at least one alignment tab extending outwards and from an outer surface of the first end of the first connector, the at least one alignment tab positioned to correspond with at least one alignment slot in an end of the first tubing section.

18. The connection system of claim 17 further comprising the first tubing section connected to the first connector, the first tubing section having the at least one alignment slot in the end of the first tubing section corresponding with the at least one alignment tab on the first connector.

19. The connection system of claim 14 wherein the second connector further comprises at least one alignment tab extending outwards and from the outer surface of the first end of the second connector, the at least one alignment tab positioned to correspond with at least one alignment slot in an end of the second tubing section.

20. The connection system of claim 19 further comprising the second tubing section having the at least one alignment slot in the end of the second tubing section corresponding with the at least one alignment tab on the second connector.

* * * * *